United States Patent
Mølgaard et al.

(10) Patent No.: US 9,307,112 B2
(45) Date of Patent: Apr. 5, 2016

(54) IDENTIFYING DOMINANT AND NON-DOMINANT IMAGES IN A BURST MODE CAPTURE

(71) Applicant: Apple Inc., Cupertino, CA (US)

(72) Inventors: Claus Mølgaard, Los Gatos, CA (US); Mikael Rousson, San Jose, CA (US); Vincent Yue-Tao Wong, Santa Clara, CA (US); Brett M. Keating, San Jose, CA (US); Jeffrey A. Brasket, San Francisco, CA (US); Karl C. Hsu, Cupertino, CA (US); Todd S. Sachs, Palo Alto, CA (US); Justin Titi, Morgan Hill, CA (US); Elliott B. Harris, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/097,670

(22) Filed: Dec. 5, 2013

(65) Prior Publication Data

US 2014/0354845 A1 Dec. 4, 2014

Related U.S. Application Data

(60) Provisional application No. 61/829,990, filed on May 31, 2013.

(51) Int. Cl.
*H04N 1/21* (2006.01)
*H04N 5/262* (2006.01)
*H04N 5/232* (2006.01)

(52) U.S. Cl.
CPC ............. *H04N 1/215* (2013.01); *H04N 5/2621* (2013.01); *H04N 5/2625* (2013.01); *H04N 5/23216* (2013.01); *H04N 5/23293* (2013.01)

(58) Field of Classification Search
CPC ....... H04N 5/2356; H04N 5/228; H04N 5/76; H04N 1/215; H04N 5/2621; H04N 5/2625; H04N 5/23216; H04N 5/23293; H04N 5/23229
USPC .............................. 348/222.1, 333.01, 240.99
See application file for complete search history.

(56) References Cited

U.S. PATENT DOCUMENTS

| | | | |
|---|---|---|---|
| 8,736,716 B2 | 5/2014 | Prentice | |
| 2005/0219686 A1* | 10/2005 | Osa et al. | 348/240.3 |

(Continued)

FOREIGN PATENT DOCUMENTS

WO WO2013160524 A1 * 10/2013

OTHER PUBLICATIONS

Kheterpal, "Add Burst Mode to Your iPhone Camera with Fast Camera App," dated Mar. 10, 2012, SimonBlog, http://www.simonblog.com/2012/03/10/add-burst-mode-to-your-iphone-camera-with-fast-camera-app/, 10 pages.

*Primary Examiner* — Tuan Ho
*Assistant Examiner* — Marly Camargo
(74) *Attorney, Agent, or Firm* — Morgan, Lewis & Bockius LLP

(57) ABSTRACT

For cameras that capture several images in a burst mode, some embodiments of the invention provide a method that presents one or more of the captured images differently than the remaining captured images. The method identifies at least one captured image as dominant image and at least another captured image as a non-dominant image. The method then displays each dominant image different from each non-dominant image in a concurrent presentation of the images captured during the burst mode. The dominant images may appear larger than non-dominant images, and/or appear with a marking that indicates that the images are dominant.

18 Claims, 28 Drawing Sheets

(56) References Cited

U.S. PATENT DOCUMENTS

| | | | |
|---|---|---|---|
| 2006/0221223 A1* | 10/2006 | Terada | 348/333.05 |
| 2009/0309990 A1* | 12/2009 | Levoy et al. | 348/222.1 |
| 2011/0034176 A1* | 2/2011 | Lord et al. | 455/561 |
| 2011/0193996 A1* | 8/2011 | Onoda et al. | 348/231.99 |
| 2012/0242853 A1* | 9/2012 | Jasinski et al. | 348/222.1 |
| 2012/0249853 A1* | 10/2012 | Krolczyk et al. | 348/333.01 |
| 2012/0257071 A1* | 10/2012 | Prentice | 348/220.1 |

* cited by examiner

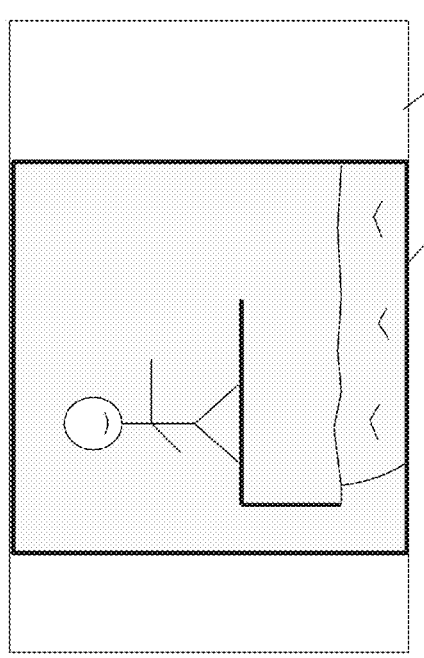
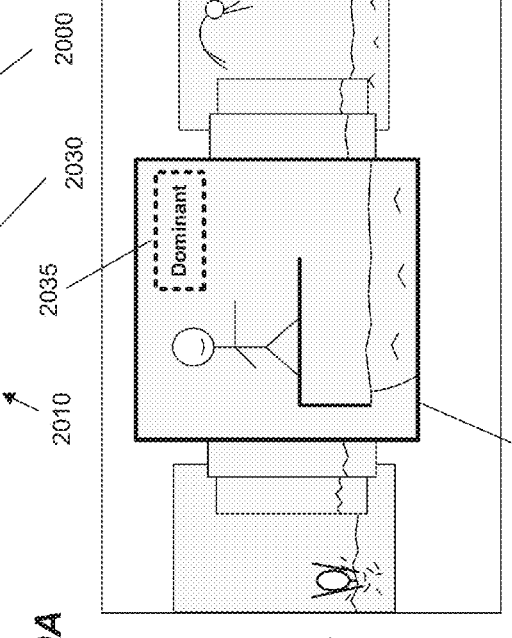
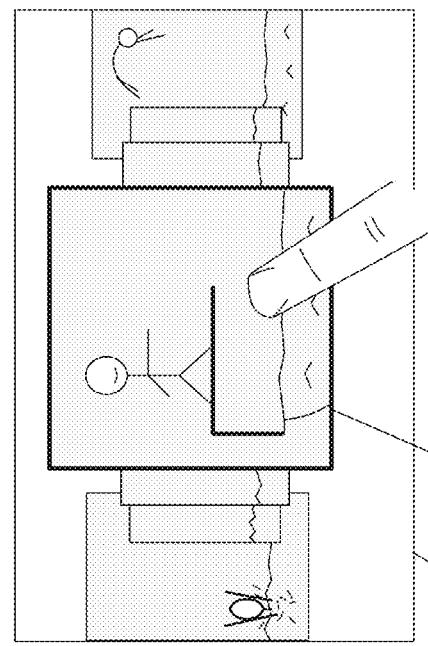
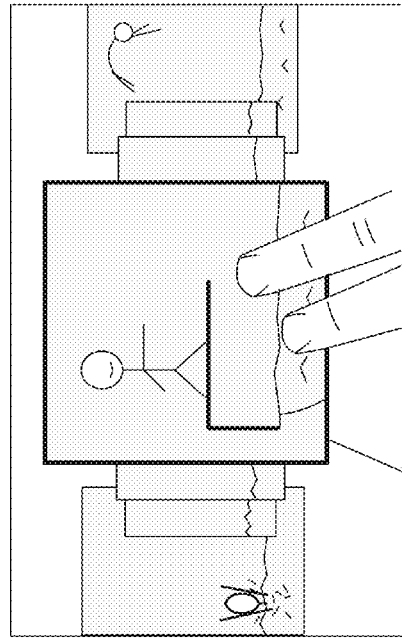
Figure 20A
Figure 20B

IDENTIFYING DOMINANT AND NON-DOMINANT IMAGES IN A BURST MODE CAPTURE

BACKGROUND

With the advent of digital photography, a person no longer has to buy film to take pictures. In addition, the person does not have to take the film to a film developer, wait some time to have it processed, and then return to the developer to finally look at the finished pictures. Nowadays, a person can just snap a picture with a digital camera and look at the picture. If the person does not like the picture, he or she can take another one. Also, people can take pictures with all kinds of devices. Examples of such devices include digital cameras, smart phones, tablets, laptops, etc.

The problem today is not so much about the convenience in taking pictures or the wait to have the pictures ready. Rather, it is more and more about taking too many pictures. A person can have hundreds or thousands of pictures taken, however, sorting through those pictures and finding a few pictures that the person actually likes is a lengthy process. This problem may get even worse because many devices are now supporting a continuous high-speed shooting mode. In this burst mode, a camera takes many still shots (e.g., tens or hundreds of shots) in one quick succession.

An easy solution to sorting through the vast number of pictures is to delete some or most of the pictures. However, people change their minds all the time on what constitutes representative pictures. Therefore, deleting the undesired pictures at one time may subsequently lead to loss of potentially desired pictures at another time. Another solution is to organize the pictures into different albums, but this solution requires a lot of time and effort, and yet at the end it could be very hard to remember which pictures are in which albums.

BRIEF SUMMARY

For cameras that capture several images in a burst mode, some embodiments of the invention provide a method that presents one or more of the captured images differently than the remaining captured images. The method identifies at least one captured image as a dominant image and at least another captured image as a non-dominant image. The method then displays each dominant image different from each non-dominant image in a concurrent presentation of the images captured during the burst mode. The dominant images may appear larger than non-dominant images, and/or appear with a marking that indicates that the images are dominant.

For several images captured in a single burst mode operation, the method of some embodiments can designate multiple images as dominant images while designating multiple other images as non-dominant images, and can display the dominant images differently than the non-dominant images in the concurrent presentation. In some embodiments, the burst mode capture is presented on a touchscreen display of a mobile device. The method in some such embodiments receives a touch input on the touchscreen display to designate an image as either a dominant or non-dominant image. For instance, the method may detect a single-finger or multi-finger tap gesture over an image on the touchscreen display and designate the image as a dominant image in the burst mode sequence of images.

The image editing application of some embodiments designates an image in a group of images as dominant or non-dominant regardless of whether the group is a burst mode sequence. For instance, a user may classify an image that belongs to a collection (e.g., a camera roll) as the dominant image of the collection. The collection then will be represented by the dominant image. In some embodiments, the user may classify not only images that belong to different groups, but also the groups themselves. For instance, the user may classify a group of images, amongst several other groups of images, as a dominant group. All different groups of images will then be represented by the dominant group.

The method of some embodiments presents a single composite image (thumbnail or larger sized image) to represent multiple images that are captured from an action sequence in a single burst mode. One example of such an action sequence is a diver diving into a pool. The action sequence might include (1) the diver standing at the podium, (2) the diver in the air, (3) the diver entering the water, and (4) the diver re-appearing on the surface of the water. For such a sequence, the method might generate a single composite image that is created by blending together one image of the diver in each of the four stages of the action. In selecting images for the composite representation, the method of some embodiments takes into account whether the images are dominant or non-dominant images.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purposes of explanation, several embodiments of the invention are set forth in the following figures.

FIGS. 20A and 20B illustrate an example of using a first touch gesture to display a full screen representation of an image and using a second different touch gesture to classify the image.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For cameras that capture several images in a burst mode, some embodiments of the invention provide a method that presents one or more of the captured images differently than the remaining captured images. The method identifies at least one captured image as a dominant image and at least another captured image as a non-dominant image. The method then displays each dominant image different from each non-dominant image in a concurrent presentation of the images captured during the burst mode. The dominant images may appear larger than non-dominant images, and/or appear with a marking that indicates that the images are dominant.

For several images captured in a single burst mode operation, the method of some embodiments can designate multiple images as dominant images while designating multiple other images as non-dominant images, and can display the dominant images differently than the non-dominant images in the concurrent presentation. In some embodiments, the burst mode capture is presented on a touchscreen display of a mobile device. The method in some such embodiments receives a touch input on the touchscreen display to designate an image as either a dominant or non-dominant image. For instance, the method may detect a single-finger or multi-finger tap gesture over an image on the touchscreen display and designate the image as a dominant image in the burst mode sequence of images.

In some embodiments, an application (e.g., a camera application, image-editing application) automatically designates one or more images in a burst mode sequence as dominant images. The application may designate images as dominant images based on different criteria. For example, a camera may capture a burst mode sequence where several of the pictures are blurry due to movement of objects and/or people they contain. In such cases, the application may choose several pictures from the sequence based on their sharpness and their position along the sequence. That is, the application might select one picture that is least blurry from the beginning of the sequence and select a few more similarly least blurry pictures from the middle and end of the sequence. Different from the application, the user may take a more subjective approach in choosing one or more images over other images. For instance, the user may not only look at the sharpness of the images but may take into consideration other factors that make a set of one or more images the user's dominant pick.

Figure 1:
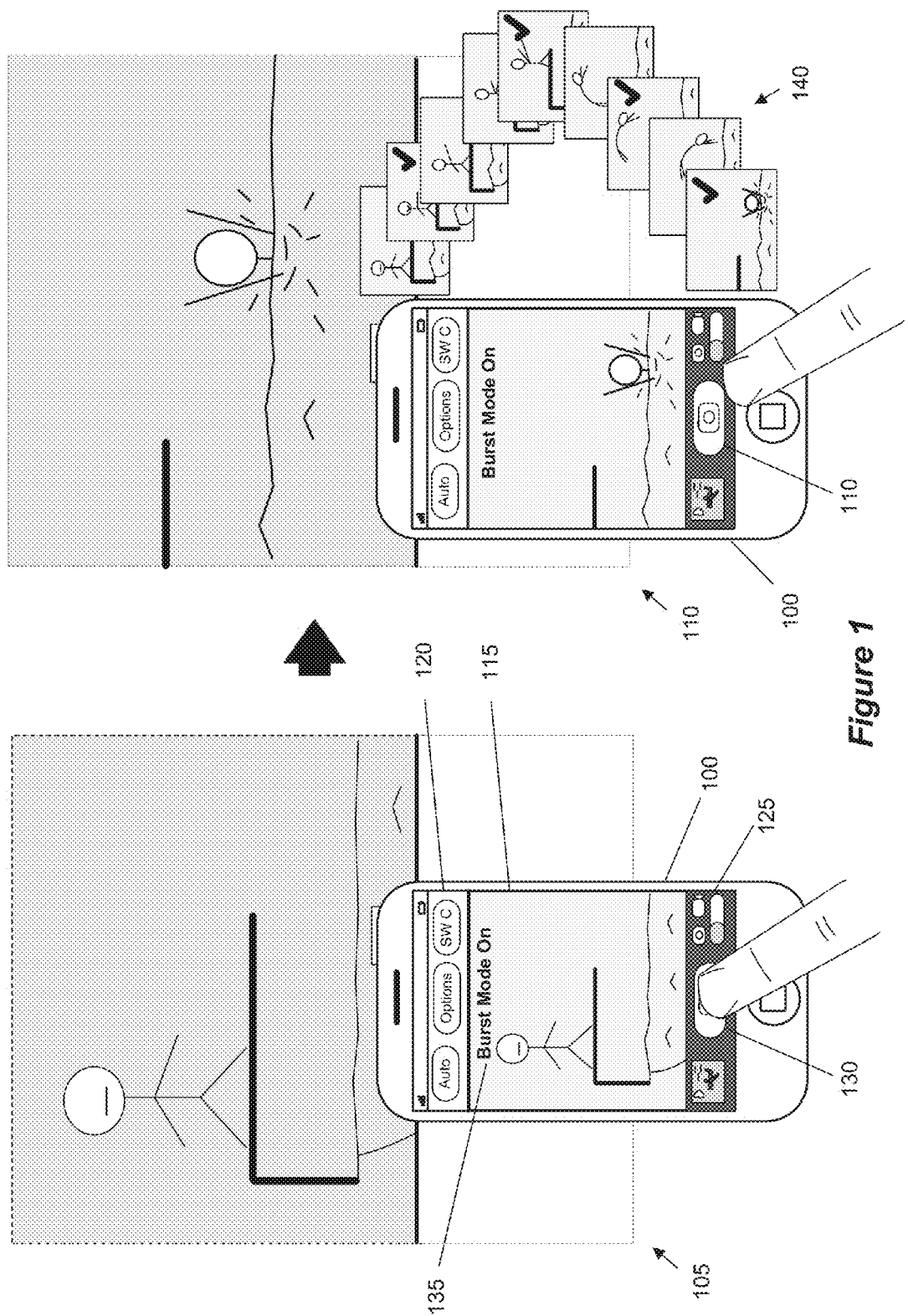
FIG. 1 illustrates an example of capturing a burst mode sequence of images.

FIG. 1 illustrates an example of capturing a burst mode sequence of images. Specifically, this figure illustrates in two operational stages 105 and 110 how a mobile device 100 can be used to capture a series of shots in a single burst mode operation. Here, a smart phone 100 is used to capture the burst mode sequence. One of ordinary skill in the art will realize that the discussion in this example as well as other examples hereinafter is equally applicable to other kinds of devices that are capable of taking pictures (e.g., a tablet, a camera, etc.) or any other electronic devices.

As shown, the device 100 has a touch-sensitive screen 115. The camera application has been launched to place the mobile device in a camera mode. In this mode, the mobile device can be used to take pictures or videos. The screen 115 displays a camera preview from a vantage point of one of the device's cameras (e.g., front-facing or rear-facing camera). The camera application provides a number of affordances to modify the camera settings. In the example shown in FIG. 1, most of the affordances are arranged along the top and bottom bars 120 and 125 that overlay the camera preview.

The top bar 120 includes one affordance for setting the camera flash to on, off, or automatic based on the lighting conditions. The other affordance in the top bar 120 is for switching from using the rear-facing camera to the front-facing camera, or vice versa. The top bar 120 also includes an affordance to show other options to specify whether the camera preview should show a grid, whether images should be captured in high dynamic range (HDR), and/or whether to capture a panoramic image.

The bottom bar 125 shows several other affordances. It includes a selectable item to switch between taking pictures and video. The bottom bar 125 also shows a thumbnail image of the last picture or a frame of a video taken with the mobile device. In some embodiments, the camera application allows the user to select the thumbnail image to display a collection (e.g., a virtual camera roll) of images and videos captured with the device. In addition, the camera application of some embodiments allows the user to use several different touch gestures to set other settings. For instance, the user can tap the screen 115 to autofocus on a portion of the scene that is shown at or near the tapped area. The user can perform another gesture (e.g., a pinch gesture) to set the zoom level. The gesture may in turn cause a zoom level slider to appear. The camera application may also allow the user to lock the exposure setting (e.g., aperture and shutter speed) and/or the autofocus settings (e.g., through a tap and hold operation).

The touchscreen 115 in FIG. 1 shows a visual indication 135 that the burst mode has been turned on. The camera application of some embodiments provides an affordance (e.g., along the top or bottom bar 120 or 125) to turn on or off burst mode capture. The camera application may also provide an affordance to specify the capture speed (e.g., number of frames per second, high speed, low speed, etc.). One of ordinary skill in the art would understand that the visual indication 135 is just an example indication and that there are numerous other ways to provide similar feedback.

Having described some features of the mobile device in camera mode, an example of capturing a burst mode sequence will now be described by reference to the two stages 105 and 110 that are illustrated in FIG. 1. In the first stage 105, the mobile device 100 has been placed in the camera mode to take pictures. The burst mode capture has been turned on. The rear camera is the active camera, and it is pointing towards a scene. The scene shows a person standing on a diving board that is ready to dive into a pool. This same scene is shown as a preview on the device's screen.

In the first stage 105, the user selects the camera affordance 130 to capture a burst sequence of the scene. Specially, the user taps and holds the user's finger over the affordance until the desired action shots are captured. Upon capturing the sequence of pictures, the camera application of some embodiments allows the user to choose several of the pictures. Rather than retaining all the pictures, the camera application then retains only those chosen pictures. This option is particularly useful when there are many images in a burst mode sequence.

The second stage 110 conceptually illustrates a sequence of pictures captured with the device 100 during the burst mode operation. That is, it illustrates a number of pictures that were captured in succession while the burst mode feature was turned on and the affordance 130 was held down by the user. The sequence 140 includes nine pictures. The pictures generally show a person standing on a divining board, jumping off the diving board, entering the pool, and emerging from the pool.

As mentioned above, the application of some embodiments automatically designates one or more pictures in a burst mode sequence as dominant pictures. In the example of FIG. 1, the camera application has chosen four pictures (i.e., the second, fifth, seventh, and ninth pictures) as the representative (dominant) ones in the burst mode sequence. For illustrative purposes, each of the four chosen pictures is shown in the second stage 110 with a check mark. The application of some embodiments may have chosen these pictures because of their sharpness as compared to other pictures. Alternatively, the application of some other embodiments may choose these pictures based on their position along the sequence. Yet, in some other embodiments, the application may designate these pictures in accord with user input.

Figure 2:
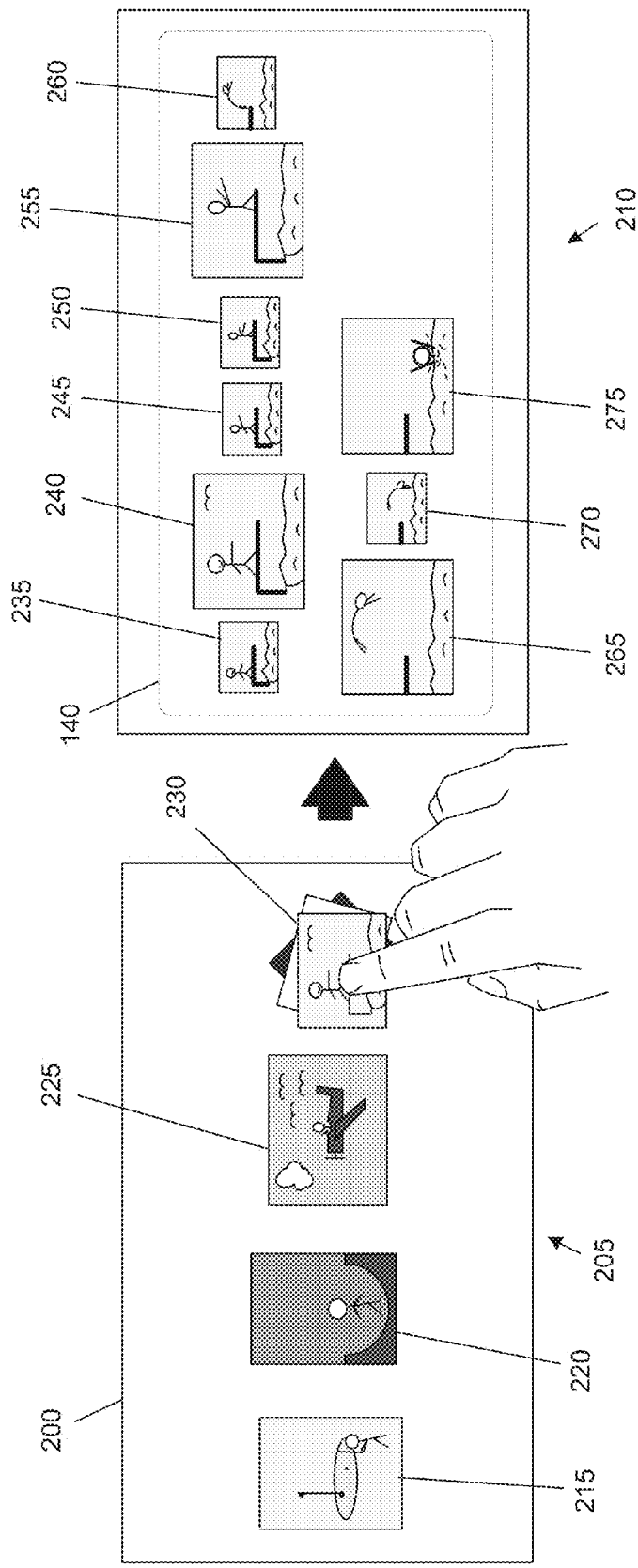
FIG. 2 conceptually illustrates an example of how some embodiments present dominant images different from non-dominant images.

Irrespective of how the dominant images are chosen, the application presents the dominant images differently from the non-dominant images in a concurrent presentation. FIG. 2 conceptually illustrates an example of how some embodiments present dominant images different from non-dominant images. This figure also introduces how a burst mode sequence of images is presented different from other images or video. Two successive stages 205 and 210 of a presentation display area 200 are shown in this figure. In this example, the display area 200 can be any user-interface area that displays a group of media items (e.g., images, video clips, audio clips, etc.).

The first stage 205 illustrates the display area 200 presenting thumbnail representations 215-230 of several images, including a burst mode sequence. The thumbnail images 215-225 are small representation of full-size images. Here, each of the thumbnails shows the whole image in accordance with the image's aspect ratio. However, the thumbnails may be presented all as square thumbnails, irrespective of the aspect ratio of the full-size images. The presentation display area 200 may also show thumbnail representations of video clips. Each video clip representation may appear with a marking (e.g., a play button) to differentiate it from a still-image representation.

The application of some embodiments displays representations of burst mode sequences different from other representations. Different from a still image, the burst mode sequence is presented as a composite image. Specifically, thumbnails of several images in the burst sequence are stacked on top of each other as a stack of images. Any number of thumbnails can be stacked on top of each other. In addition, the stack may begin with the first image on top, followed by the next image, and so forth. Alternatively, in some embodiments, the sequence may be based on location. For example, the stack of some such embodiments may begin with the first image on top, jumping to a middle image in the sequence, and a last image, or a similar pattern depending on the number of images to show in the stack representation.

In some embodiments, the stack representation is generated by selecting dominant images from the burst mode sequence. For instance, the stack may start with the first dominant image on top, then the next dominant image, and so forth. This is shown in the first stage 205, as the top thumbnail image is not the first image in the burst mode sequence but the first dominant image. Additional examples of generating a stack representation will be described in detail below by reference to FIG. 24.

In the first stage 205, the user selects the burst mode sequence by tapping the user's finger over the stack representation 230. As shown in the second stage 210, the selection causes the images in the sequence 140 to be shown in the display area 200. The second stage 210 illustrates an example of concurrent presentation of the images of the sequence captured during the burst mode. This is just one example presentation. As will be described below, some embodiments present images in a burst mode presentation. The burst mode presentation can be played or scrubbed through similar to a slide show presentation or a movie presentation.

In the example of FIG. 2, the images are shown in sequence across multiple rows, starting from the first captured image to the last captured image. The images are shown as thumbnail images 235-275. This is one example of how some embodiments concurrently displays, in a presentation, thumbnail representations of the captured images (e.g., in a display area or a screen page). If all of the images from a single burst mode sequence cannot be simultaneously displayed in one screen page, the application of some embodiments concurrently displays some of the images and allows the user to scroll the page to view the remaining images. In some embodiments, the selection of any one of the thumbnail representations causes a full screen representation of the same image to be displayed in the display area 200.

The second stage 210 also illustrates how some embodiments display each representative picture different from each non-representative (non-dominant) picture in the concurrent presentation. In particular, the representative pictures appear larger than non-representative pictures. For example, the second, fifth, seventh, and ninth thumbnails 240, 255, 265, and 275 clearly appear larger than the remaining thumbnails 235, 245, 250, 260, and 270. Size is just an example consideration that the application of some embodiments takes into account when presenting dominant and non-dominant images. Alternatively, or conjunctively with the size, the application of some embodiments may highlight or mark dominant images in some manner to distinguish them from non-dominant images.

Figure 3:
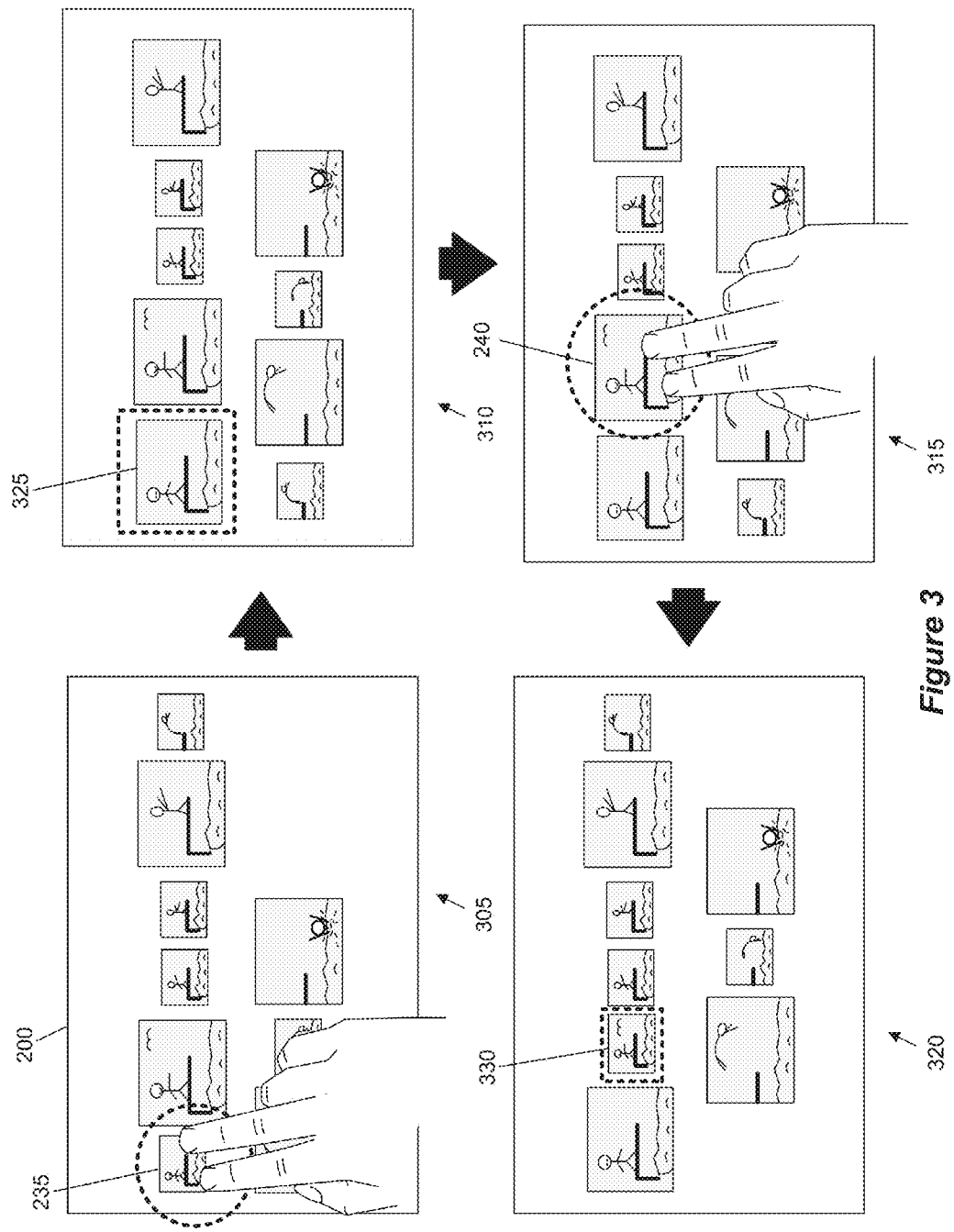
FIG. 3 conceptually illustrates an example of classifying images as either dominant or non-dominant through touch input.

For any device with a touch-sensitive screen, the application of some embodiments allows a person to perform a touch gesture over an image shown on the touchscreen to designate that image as a dominant or non-dominant image. FIG. 3 conceptually illustrates an example of classifying images as either dominant or non-dominant through touch input. Four stages 305-320 are shown in this figure. These stages are a continuation of the ones shown in the previous figure.

The first stage 305 shows the concurrent presentation of the images captured during the burst mode. The second, fifth, seventh, and ninth thumbnails represent the dominant images in the burst mode, while the remaining thumbnails represent the non-dominant images. The first stage 305 also shows the selection of a non-dominant image to classify it as a dominant image. Specifically, the user selects the first thumbnail 235 to designate the first image in the burst mode sequence as a dominant image. The user selects the first image through a touch gesture by tapping the user's fingers on the touchscreen over the thumbnail image 235. In this example, the touch gesture is a two-finger tap gesture. However, a single-finger or other multi-finger tap gestures or some other gestures can be used, in some embodiments.

The second stage 310 shows the display area 200 with the updated presentation of the images captured during the burst mode. The selection of the thumbnail image 235 resulted in the first image being designated as a dominant image. Accordingly, the first image is represented by a new thumbnail image 325. The new thumbnail image 325 has the same format (e.g., the same size, the same resolution, etc.) as thumbnail images of other dominant images.

The third stage 315 illustrates the selection of a dominant image to reclassify it as a non-dominant image. Specifically, the user selects the second image through the same touch gesture by tapping the user's fingers on the touchscreen over the thumbnail image 240. The fourth stage 320 shows the display area 200 with the updated presentation of the images captured during the burst mode. The selection of the thumbnail 240 resulted in the second image being designated as a non-dominant image. Accordingly, the second image is represented by a new thumbnail image 330. The new thumbnail image 330 has a size that is the same or in the same format as thumbnail images of other non-dominant images.

In the examples described above, the application presents dominant images different from non-dominant images. Several additional examples will now be described by reference to FIGS. 4-17. These examples illustrate how the presentation can vary from one device to another device in different embodiments. For instance, the dominant images may appear larger than non-dominant images on one device of some embodiments, and/or appear with a marking or highlight that indicates that the images are dominant on another device of some other embodiments.

Figure 4:
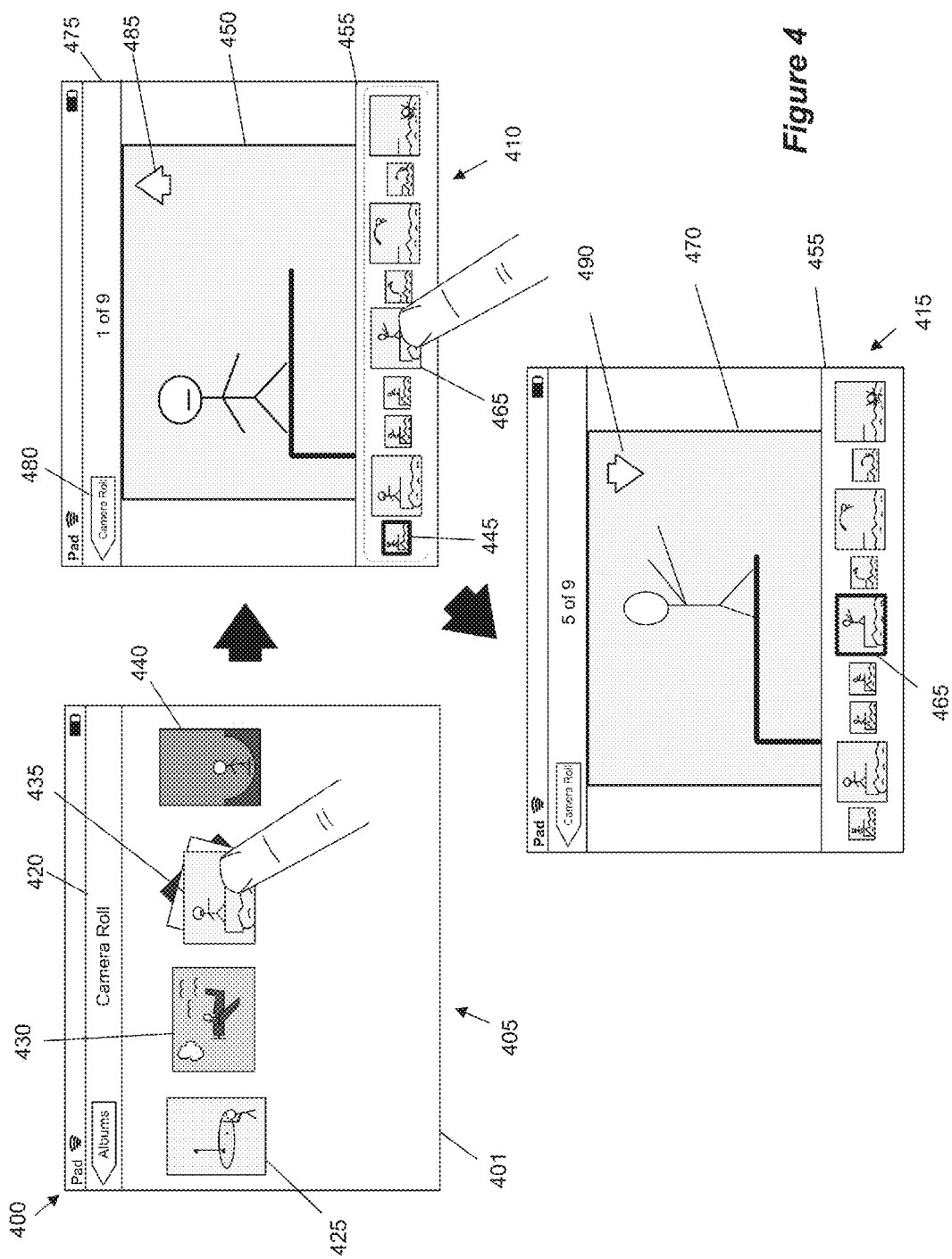
FIG. 4 illustrates an example of how some embodiments present images captured in a burst mode operation.

FIG. 4 illustrates an example of how some embodiments present images captured in a burst mode operation. In this example, the burst mode sequence is presented on a tablet 400 having a touch-sensitive screen. Three operational stages 405-415 of the tablet are shown in this figure. The first stage 405 illustrates thumbnail representations of different images from a collection. The collection is a camera roll that displays pictures and/or videos taken with the tablet or alternatively taken by other devices and subsequently downloaded on the tablet. This is shown by the "Camera Roll" label that is on a top bar 420 that overlays the presentation display area 401. The first stage 405 shows thumbnail representations 425, 430, and 440 of still images captured with the device. Different from a still image, the burst mode sequence is presented as a stack representation 435.

In the first stage 405, the user selects the burst mode sequence by tapping the user's finger over the stack representation 435. As shown in the second stage 410, the selection causes the tablet to display (1) a full screen representation 450 of the first image in the sequence and (2) thumbnail representations of the images in the sequence. Specifically, the full screen representation of the first image is on the display area 401, while the thumbnail representation are arranged along a bottom bar 455 (also referred to as a navigation bar) that overlays the display area. To provide a visual indication of the current image being shown on the display area 401, the thumbnail representation 445 of the first image is highlighted on the bottom bar 455. Similar to the example described above, the thumbnails of the dominant images appear larger than the thumbnails of the non-dominant images. The user can select any one of the thumbnail images to display a full-screen representation on the display area 401.

In addition to the bottom bar 455, a top bar 475 overlays the display area 401. The top bar shows a label that identifies the first of nine images is being shown on the display area 401. The top bar also includes an affordance 480 to return to the previous view (i.e., the camera roll view), as illustrated in the first stage 405. In some embodiments, the user can perform a touch gesture (e.g., tap the user's finger on the touchscreen over the full screen representation 450) to show or hide the top and bottom bars 475 and 435.

In the example of the second stage 410, the full screen representation is shown with a marking 485. Similar to the smaller size of the thumbnail image 445, the marking 485 provides a visual indication that the first image is a non-dominant image. The marking 485 is a directional arrow pointing up; but it can be any other marking, symbol, and/or text that convey the same meaning. In some embodiments, the marking 485 is an affordance that when selected designates the displayed image as a dominant or non-dominant image.

In the second stage 410, the user selects the fifth image from the burst mode sequence by tapping the user's finger on the touchscreen over thumbnail representation 465 on the bottom bar 455. As shown in the third stage 415, the selection causes the thumbnail representation 465 to be highlighted on the bottom bar and causes a full-screen representation 470 to be shown on the display area 401. The fifth image is one of the dominant images in the burst mode sequence. This is shown with the larger size of the thumbnail image 465. This is also shown with a marking 490 that is displayed at least partially over the full screen representation 470. Different from the marking 485, the marking 490 is an arrow that is pointing down. This down arrow provides the user with a visual indication that it can be selected to demote the dominant image to a non-dominant image. As mentioned above, the marking is just one of countless number of markings, symbols, and/or texts that can be used to provide the same or similar indication.

Figure 5:
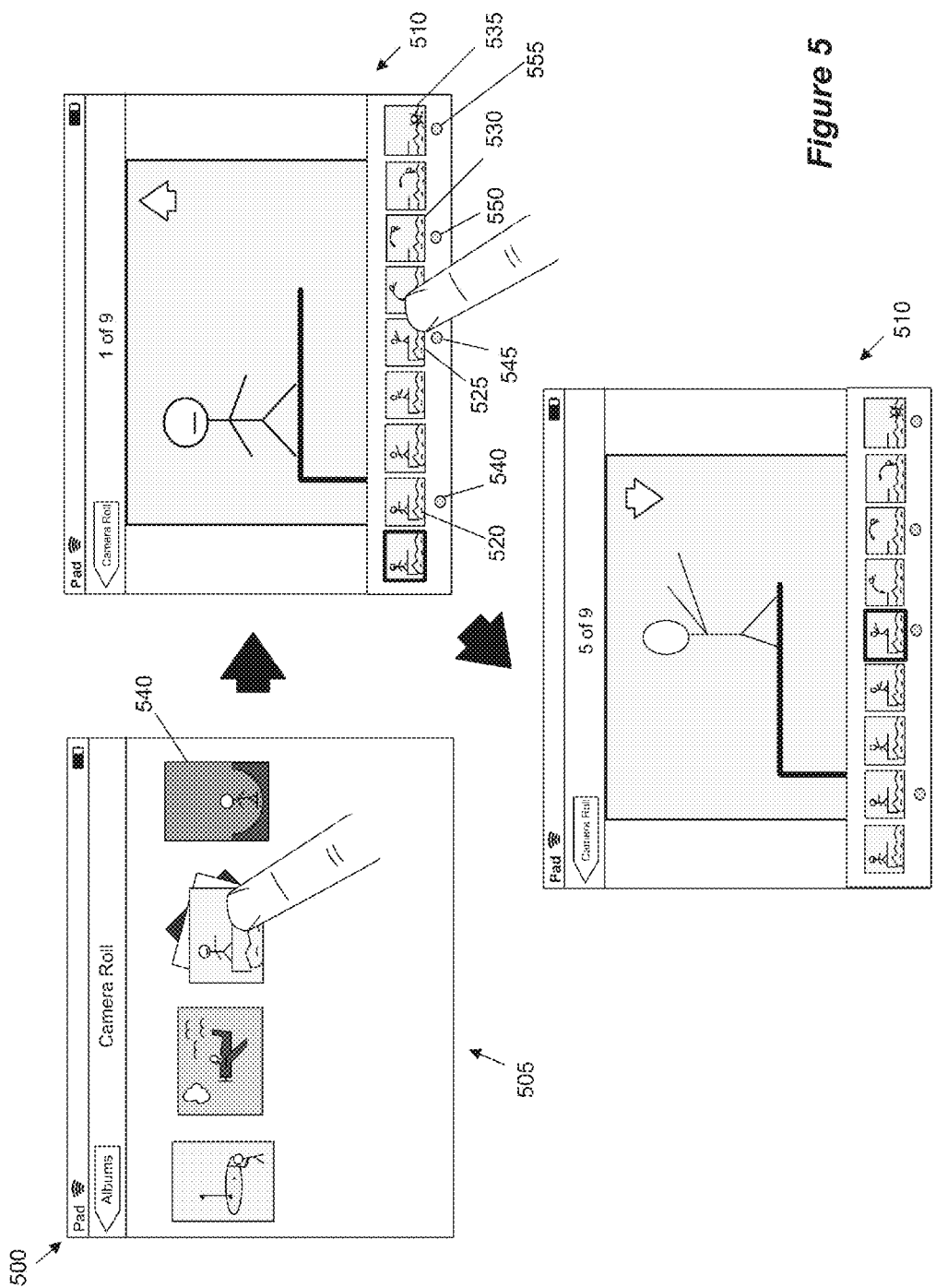
FIG. 5 illustrates another example of a concurrent presentation of pictures captured during a single burst mode capture.

FIG. 5 illustrates another example of a concurrent presentation of pictures captured during a single burst mode capture. Specifically, this figure shows that the presentation differentiates dominant and non-dominant images by using a set of one or more markings. That is, rather than using different sizes, the thumbnail representation of each dominant or suggested image is shown with a marking or visual indication.

Three operational stages 505-515 of the tablet 500 are shown in FIG. 5. These stages 505-515 are identical to the ones shown in the previous figure. However, the thumbnail representations of the dominant images 520-535 do not appear any larger than the thumbnail representations of the non-dominant images. Here, the dominant images appear with markings 540-555. In this example, each marking is a colored dot, but the marking could be any type of visual indication (e.g., an icon, text, symbol such as a check mark) that indicates that the marked image is different from a non-marked image. Also, the marking is displayed below each thumbnail representation of a suggested photo. Instead of below the representation, the marking can be displayed anywhere, such as over the representation, above or to the side of the representation, next to the name of the photo, etc.

In some embodiments, the marking changes appearance to inform a person that the corresponding photo is a program-suggested photo, or a user-suggested photo. For example, the marking 540 of thumbnail image 520 may change from one color to another when a person' chooses that image as the user's pick or the user's specified dominant image. Other example of appearance change include changing the size of the marking, displaying a different icon or symbol, etc.

In some embodiments, the marking do not change in appearance; instead, it is displayed with another marking. For example, when a photo is both machine-suggested and user-suggested photo, then the photo may be displayed with multiple markings (e.g., one marking that identifies the photo as machine-suggested photo and a different marking that identifies the photo as a user-suggested photo). In some embodiments, the application displays each dominant image from each non-dominant image by displaying the non-dominant image with a marking. As an example, each non-dominant image may appear with a particular marking that differentiates the non-dominant image from each other dominant image, while each dominant image may appear with no marking or a different marking.

The next three figures provide examples of how some embodiments present a burst mode sequence on a different type of mobile device, namely a smart phone. One of ordinary skill in the art would understand that the examples described above and below can be combined in any number of ways to present the burst mode sequence on any type of device (e.g., a smart phone, tablet, smart television, etc.).

Figure 6:
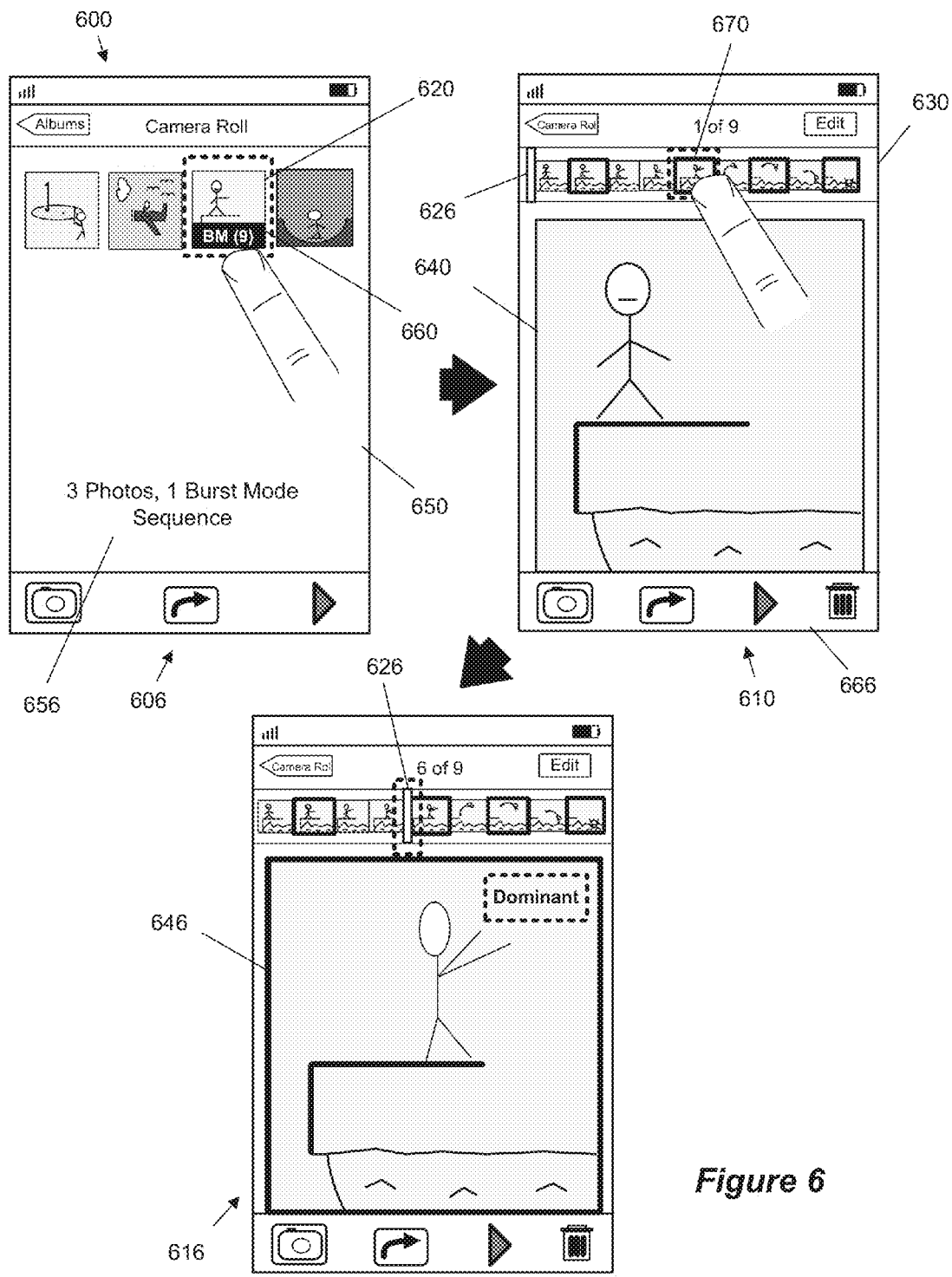
FIG. 6 illustrates another example of how some embodiments present a burst mode sequence of images on a mobile device.

FIG. 6 illustrates a first example of how some embodiments present a burst mode sequence of images on a mobile device 600. Three operational stages 605-615 of the mobile device 600 are shown in this figure. The first stage 605 illustrates mobile device showing contents of a collection on its touchscreen. Similar to the last example, the collection is a camera roll that displays pictures or videos taken with the mobile device 600 or alternatively taken by other devices and subsequently downloaded on the mobile device 600. To display this view, the user might have (1) selected an icon for photo application and (2) selected the camera roll from a list of albums. Alternatively, the user might have launched the camera application to take pictures or video, and selected an affordance to view the camera roll.

In the first stage 605, the mobile device 600 displays several thumbnail images. Here, one or more of the thumbnails may represent only a portion of an image. That is, the thumbnails in the thumbnail display area 650 are all squares, irrespective of the aspect ratio of the corresponding full-size images. In order to determine the portion of a rectangular image to use for a thumbnail, the application may crop the smaller dimension of the image and use the center portion of the image in the longer dimension.

In the example of the first stage 605, the burst mode sequence is shown as a square thumbnail representation rather than a stack representation. Specially, the burst mode sequence is represented by a single thumbnail image. The application may choose the first image, the first dominant image, or any other images from the sequence in different embodiments. For instance, the thumbnail image 620 may be a low-resolution representation of the first image, the first dominant image, or any other image from the sequence in different embodiments.

Regardless of how the representative image is selected, the application presents the thumbnail 620 of the burst sequence different from thumbnails of still images or video clips. In some embodiments, the application marks the representation 620 in some manner to distinguish it from other representations. For example, the representation 620 is shown with a marking 660 that indicates the representation is a burst mode sequence. The marking 660 also includes a number that identifies the number of images in the burst mode sequence. Furthermore, the application provides a visual indication that one of the thumbnails shown in the thumbnail display area 650 is for a burst mode sequence. In particular, the thumbnail display area is labeled with text 655 which states that there are three photos and one burst mode sequence (e.g., in the camera roll).

In the first stage 605, the user selects the burst mode sequence by tapping the user's finger on the device's touchscreen display over the thumbnail representation 620. As shown in the second stage 610, the selection causes the mobile device 600 to display (1) a full screen representation 640 of the first image in the sequence and (2) thumbnail representations of the images in the sequence. Specifically, the images in the burst mode sequence are shown as thumbnails that are arranged sequentially along a bar 630. The images are shown as square thumbnails that have the same size. To differentiate non-dominant and dominant images, the application has highlighted thumbnails of the dominant images so that they appear different from thumbnails of the non-dominant images. The thumbnails are also shown with a location identifier 625. The location identifier moves along the bar to provide a visual indication of the current location in the sequence. That is, the user can view the location identifier and quickly identity which full screen image representation along the sequence is being shown on the device's touchscreen. The bottom bar 665 includes several affordances to open the camera, to share the displayed image, to play a slide show of the images in the sequence, and to delete the displayed image.

In the second stage 610, the user selects the fifth image from the burst mode sequence by tapping the user's finger on the touchscreen over thumbnail image 670 on the bar 630. The fifth image is one of the dominant images in the sequence. As shown in the third stage 615, the selection causes a full-screen representation 645 of the fifth image to be shown on the touchscreen. The selection also causes the location identifier 625 to move along the bar 630 to the location of the thumbnail image 670. In some embodiment, the application displays a full screen representation with one or more markings to indicate that the representation is for a dominant image. This is shown in the third stage 615 by highlighting the full screen representation 645 and a marking that overlays the image. In this example, the marking is a text that identifies the displayed image as a dominant image.

In several of the examples described above, the burst mode is presented as a series of thumbnail images. One drawback to this approach is that a burst mode sequence can contain many images. Due to the limited amount of screen space, it may not be possible to show all the thumbnail images in one view. One solution in some embodiments would be to show the thumbnails across multiple rows. However, this solution may further clutter the view with additional thumbnail images. A different approach in some other embodiments is to show some of the thumbnail images and allow the user to scroll across the thumbnail images. Instead of a series of thumbnail images, the application of some embodiments provides one or more other controls to easily navigate through images in a burst mode sequence.

Figure 7:
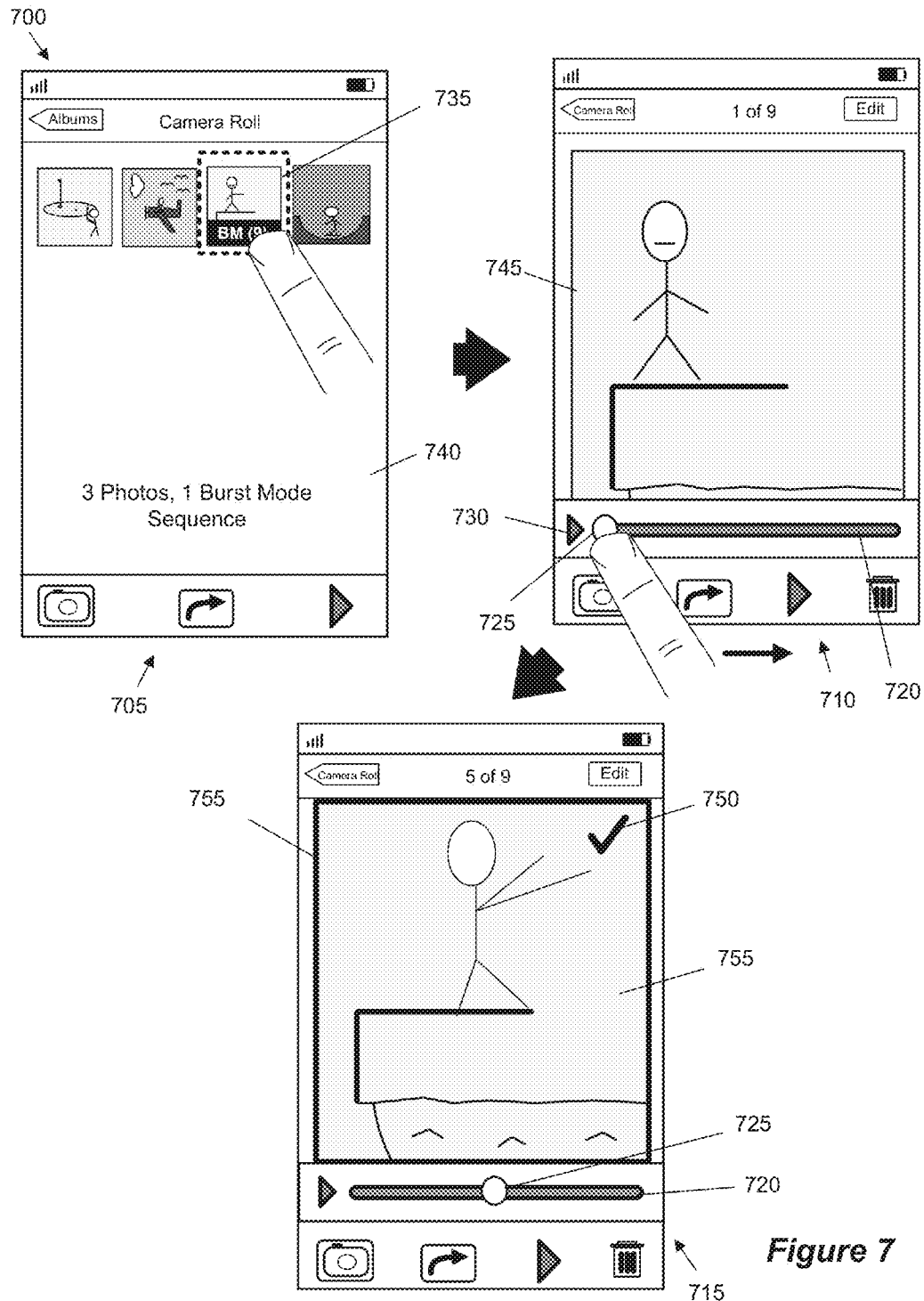
FIG. 7 illustrates another example of presenting a burst mode sequence on a mobile device.

FIG. 7 illustrates another example of presenting a burst mode sequence on a mobile device 700. Three operational stages 705-715 of the mobile device 700 are shown in this figure. These stages are similar to the previous figure. However, instead of series of thumbnail images, the application provides a slider affordance to navigate through the images in the sequence. Specifically, the application provides a slider bar 720 with a handle 725 (e.g., a position indicator) that can be selected and moved to display a particular image from the sequence. The application also provides an affordance 730 (e.g., a play button) to start a slide show starting with the current image as indicated by the handle 725 along the slider bar 720.

In the first stage 705, the user selects the burst mode representation 735 from the display area 740. As shown in the second stage 710, the selection causes a full screen representation 745 of the first image to be shown on the screen. The selection also causes the slider to appear. The handle 725 is located at the left-hand end of the slider bar 720. This provides a visual indication that the full screen representation 745 is a representation of the first image.

In the second stage 710, the user selects the handle 725 by placing the user's finger over it on the touchscreen display. To display another image, the user then performs a touch gesture by dragging the user's finger across the touchscreen display over the slider bar 720, which in turn causes the handle 725 to move along the bar. The touchscreen display then successively displays one or more other images from the sequence in accord with the movement of the handle.

The third stage 715 illustrates that the handle 725 has been moved to about the middle position on the slider bar 720. Accordingly, the touchscreen display presents the image along the sequence that corresponds to that position. The full screen representation 755 of the current image is overlaid by a marking 750. The marking is a check mark that provides a visual indication that the current image is a dominant image in the burst mode sequence.

Figure 8:
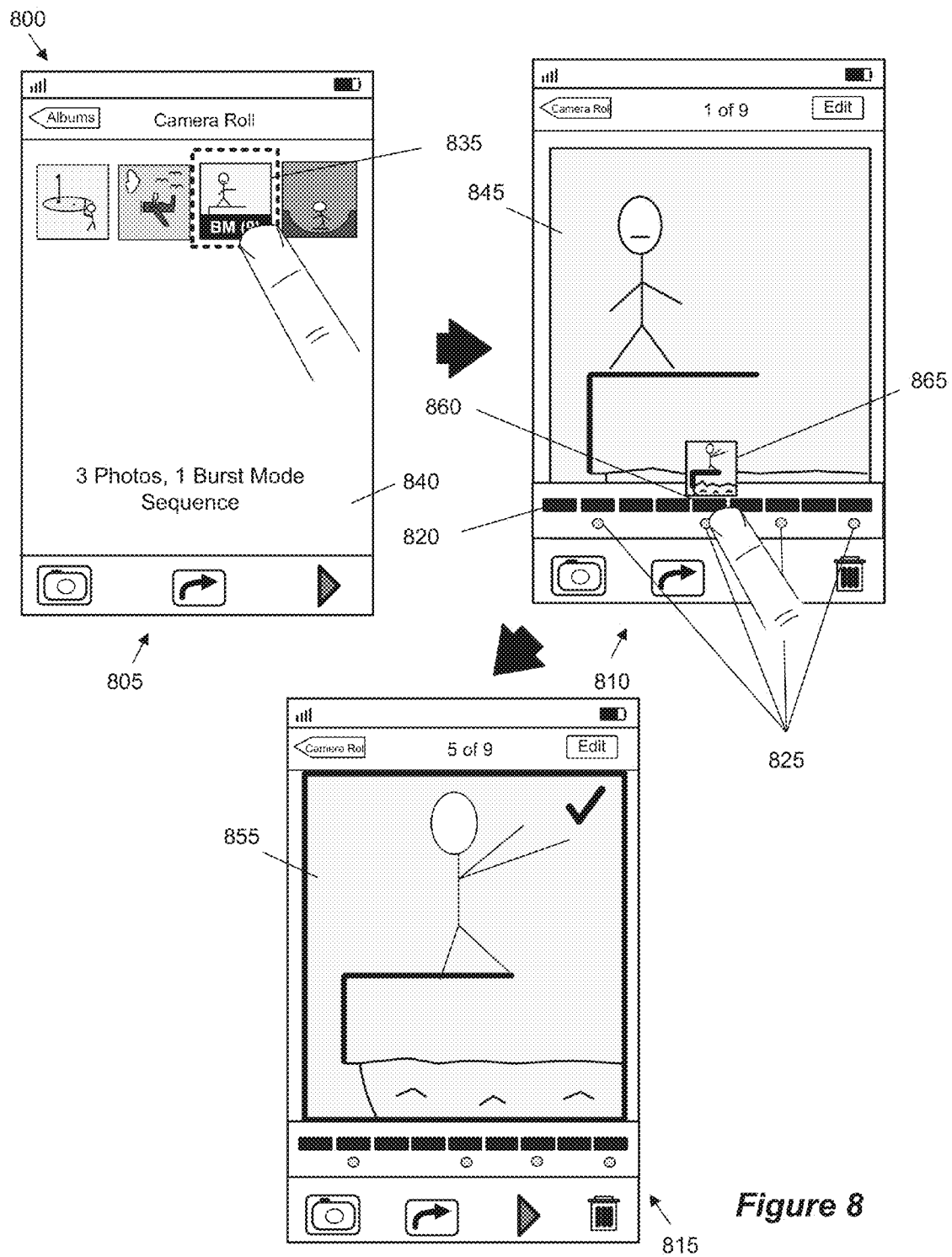
FIG. 8 provides an illustrative example of presenting pictures in a burst mode sequence as a series of shapes.

The previous example illustrates how some embodiments allow a person to navigate between images in a burst mode sequence through a slider or scrubber. In conjunction with such affordance, or instead of it, the application of some embodiments provides a series of selectable items that represents different images in a burst mode sequence. FIG. 8 provides an illustrative example of how each image can be represented as a geometric shape.

Three operational stages 805-815 of the mobile device 800 are depicted in FIG. 8. These stages 805-815 are similar to the previous figure; however, the burst mode pictures are represented by a group of shapes. In this example, the group of shapes are a series of lines 820 (e.g., thin lines) that spans across the lower portion of the device's touch-screen. Each line represents one picture in the burst mode sequence (e.g., starting from the left with the first captured picture and ending with the last captured picture). Each line can also be selected to display the corresponding picture. In some embodiments, the size of each shape can change depending on the number of pictures in a burst mode sequence. As an example, each shape will be progressively shorter in length when there are more pictures in the burst mode sequence. Alternatively, the shapes can be the same size but shown in a scrollable area so that a person can scroll the area and choose different pictures in the sequence.

To differentiate suggested pictures from non-suggested pictures, each shape for a dominant image may be shown with a marking. This is shown in the second and third stages 810 and 815 of FIG. 8 because each line that represents a dominant image is shown with a marking 825. Here, the marking is a colored dot, but the marking could be any type of visual indication (e.g., an icon, text, symbol such as a check mark) that indicates the corresponding shape represents a dominant or suggested photo. Also, the marking is displayed below each shape for a suggested photo. Instead of below the shape, the marking can be displayed anywhere, such as over the shape, above or to the side of the shape, etc. In addition, the application of some embodiments does not show any marking but displays different shapes for different types of pictures. For example, each line item may be colored differently based on whether the line represents a program-suggested photo, a user-suggested photo, or a non-suggested photo.

As shown in FIG. 8, in the first stage 805, the user selects the burst mode representation 835 from the display area 840. As shown in the second stage 810, the selection causes a full screen representation 845 of the first image to be shown on the screen. The selection also causes the series of lines 820 to appear (e.g., below and/or over the lower portion of the full screen representation. The user selects the fifth line 860 in the series. This line 860 represents the fifth image in the burst mode sequence. The selection causes a thumbnail representation 865 of the fifth image to appear. In some embodiments, the thumbnail representation only appears when the user touches and holds the user's finger on the device's touch screen over the line and disappears when the finger is released. The user can drag his or her finger across the touch screen over different line items to display representation of other images in the sequence. During that time, the full-screen representation may not change unless the user commits to a photo by releasing the user's finger over the corresponding line.

In the second stage 810, the user selects the line 860. The third stage 815 illustrates that the selection has resulted in the display of the full screen representation 855 of the fifth image.

Figure 9:
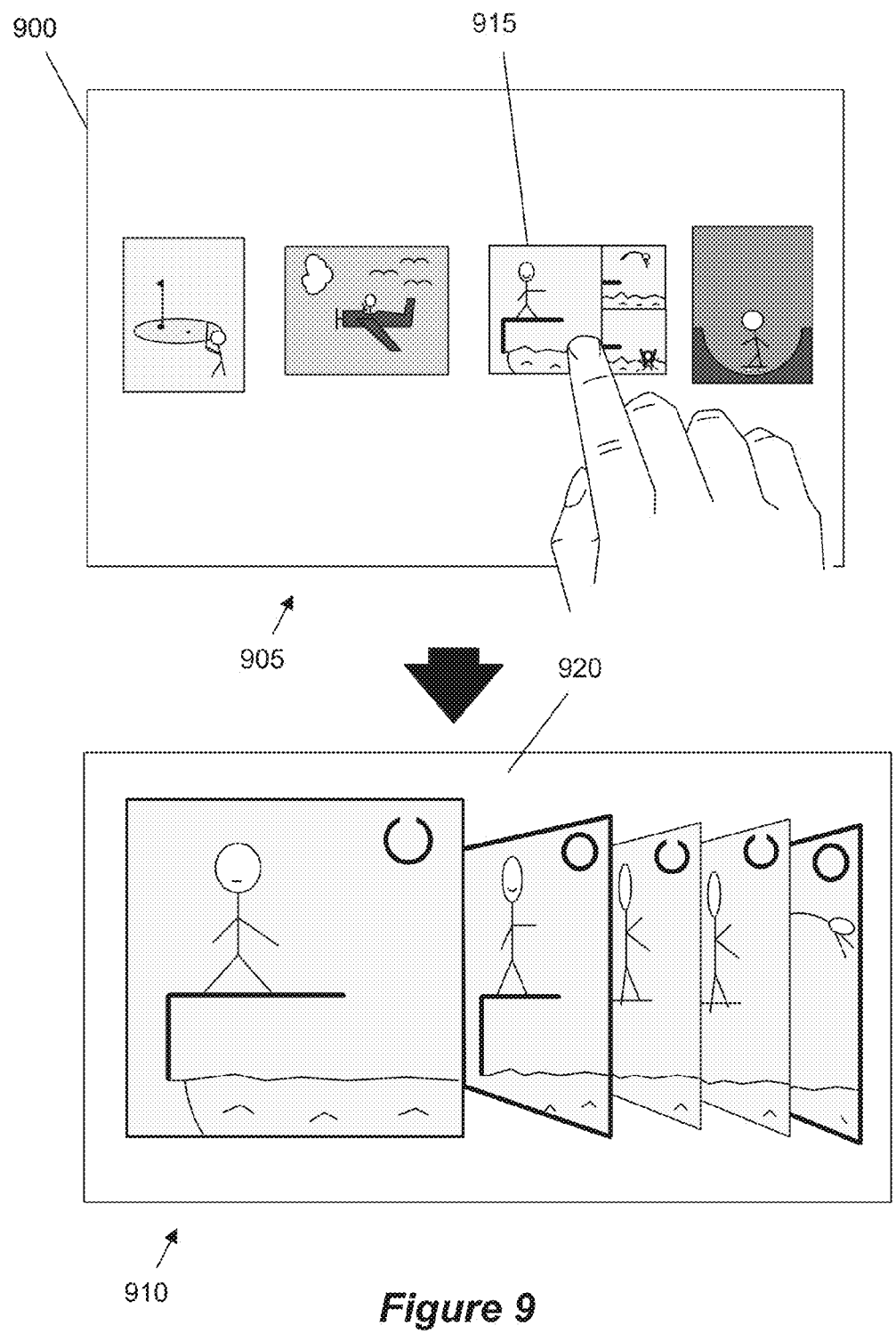
FIG. 9 illustrates an example of an animated view of several images in a burst mode sequence.

In some embodiments, the application generates an animated presentation of images in a burst mode sequence. Several examples of such an animated presentation will now be described by reference to FIGS. 9 and 10. FIG. 9 illustrates a first example of an animated view of several images in a burst mode sequence. Two stages 905 and 910 of a presentation display area 900 are shown in this figure. The presentation display area 900 can be any user-interface area that displays a group of media items (e.g., images, video clips, audio clips, etc.).

The first stage 905 illustrates the presentation display area with thumbnail representations of different images, including a burst mode sequence. Different from several of the previous examples, the burst mode sequence is presented as a composite thumbnail image 915. Specifically, thumbnails of several images in the burst sequence are shown next to each other. Any number of thumbnails can be composited to generate the composite representation in different embodiments. In addition, the composite may begin with the first image on the left, followed by the next image to the right, and so forth in some embodiments. In addition, the size of the thumbnail images can also vary in different embodiments. Several examples of generating a composite representation will be described below by reference to FIG. 22.

In the first stage 905 of the figure, the presentation display area 900 displays thumbnail representations of different images, including a burst mode sequence. The user selects the burst mode sequence by tapping the user's finger on the composite representation 915. As shown in the second stage 910, the selection causes the presentation display area 900 to display several of the images in the sequence in a particular manner. Specifically, five of the nine images in this stage are presented in a three-dimensional cover flow view 920. In this view, the application presents one center image while several of the other images are shown on the side. The side images are presented at an angle to simulate a three-dimensional view. In some embodiments, the user can interact with the view 920 to change the center image. For example, the user can flick or brush the user's finger on the surface of the touchscreen over the current image to flip through the images in the sequence.

In the example illustrated in the second stage 910, the application presents dominant images different from non-dominant images. The dominant images are highlighted in the view, while the non-dominant images are not highlighted. In addition, each of the images is shown with a marking that provides a visual indication that the image is a dominant image. In this example, each dominant image is shown with one marking (e.g., a closed circle), while each non-dominant image is shown with another marking (e.g., open circle). One of ordinary skill in the art would understand that the open and closed circle is just one of various different ways to convey that a picture is a program-suggested picture, a user-suggested picture, or a non-suggested picture. Other types of marking discussed above include check marks, arrows, colored shapes (e.g., circles), symbols, text, etc.

Figure 10:
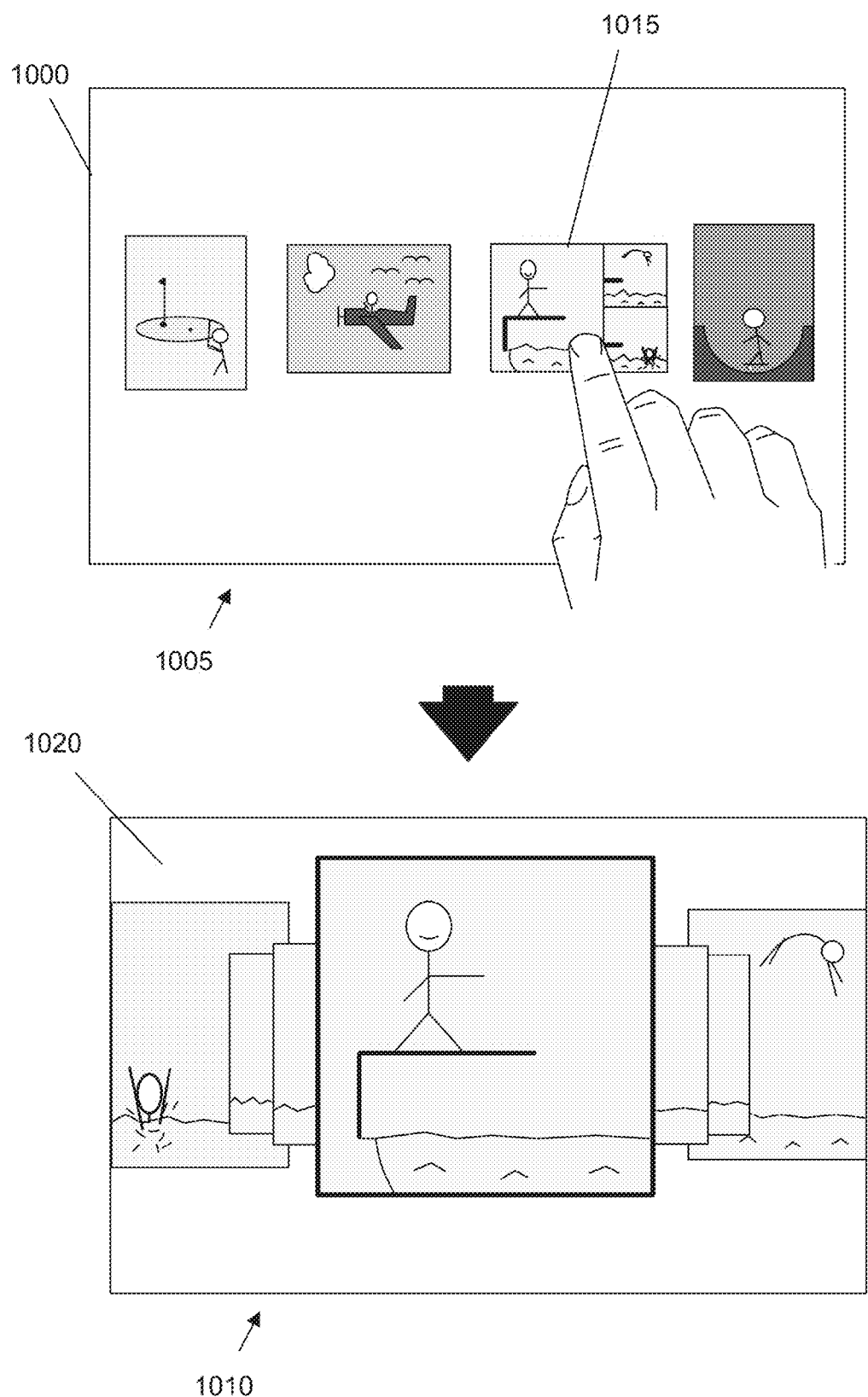
FIG. 10 illustrates another example view of a burst mode sequence.

FIG. 10 illustrates another example view of a burst mode sequence. Two stages 1005 and 1010 of a presentation display area 1000 are shown in this figure. This figure is similar to the previous example. However, the application presents a three-dimensional view of the images that rotates in a circular pattern. In this view, when the last image in the sequence is the center image, the next center image is the first image. Further, if the view is rotated in the opposite direction (e.g., counter-clockwise direction) and the center image is the first image, then the next center image is the last image from the sequence. Since the view rotates in a circular pattern like a carousel, it will be referred to as a carousel view hereinafter.

In the first stage 1005, the presentation display area 1000 displays representations of thumbnail representations of different images, including a burst mode sequence. The user selects the burst mode sequence by tapping the user's finger on the composite representation 1015. As shown in the second stage 1010, the selection causes the presentation display area 1000 to display a carousel view 1020. The view shows that the images are arranged in a circular pattern. The view also presents the dominant images different from the non-dominant images. Specifically, the dominant images appear larger than the non-dominant images even though they are further away from the center of the view than the non-dominant images.

In many of the examples described above, the application of some embodiments displays dominant imaged different from non-dominant images in a presentation of images captured during a single burst mode capture. The dominant images may be application suggested (e.g., automatically suggested) pictures or those suggested by the application's user. In some embodiments, the application provides one or more affordances that allow a person to choose whether to keep only images selected by the application, only images selected by the user, and/or any all selected images (e.g., selected by the application and the user). As an example, upon taking burst mode sequence pictures, the application may suggest several pictures from the sequence and display each suggested picture with a marking. Optionally, the user can modify the application's suggestions and chooses other pictures to be the dominant or suggested pictures. When the suggestions have been reviewed, the user can then select an option to keep only the suggested picture and delete the remaining pictures, in some embodiments.

Figure 11:
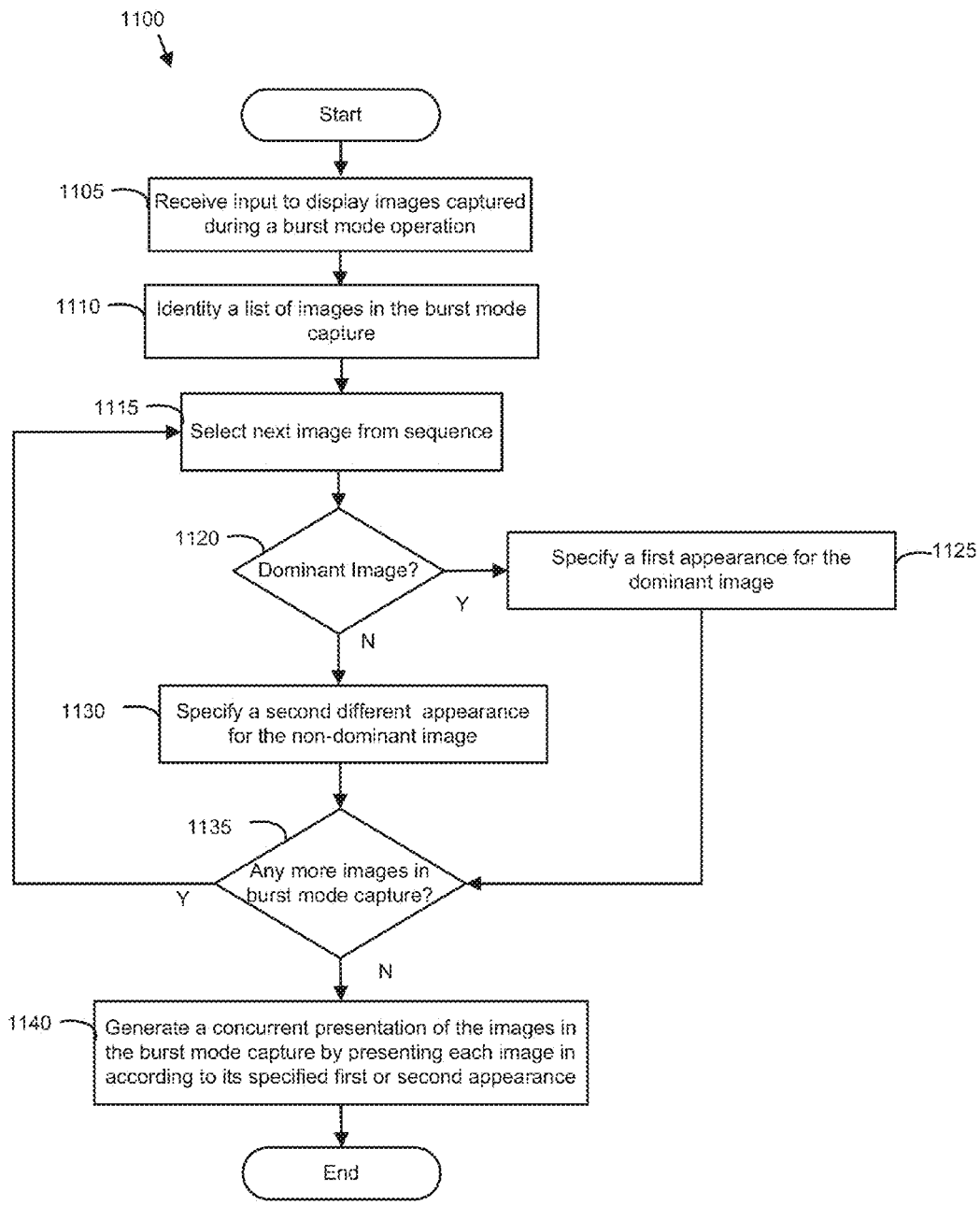
FIG. 11 conceptually illustrates a process that some embodiments use to differently present dominant and non-dominant images in a concurrent presentation of a burst mode sequence.

Having described several examples of presenting dominant images different from non-dominant images, an example process will now be described. FIG. 11 conceptually illustrates a process 1100 that some embodiments use to differently present dominant and non-dominant images in a concurrent presentation of a burst mode capture. The process 1100 in some embodiments is performed by an application (e.g., a camera application, a picture and video editing application, etc.) that executes on a computing device (e.g., a smart phone, tablet, laptop, etc.).

As shown in FIG. 11, the process 1100 begins (at 1105) when it receives input to display images captured during a burst mode operation. In several of the examples described above, the application allows a user to choose a burst mode sequence by selecting its representation (e.g., thumbnail representation). The process 1100 then identifies (at 1110) a list of images in the burst mode capture. In some embodiments, the process 1100 maintains a database of media items (e.g., videos, images, audios) and/or different collections (e.g., albums, burst mode sequences). The database may be used to organize the media items and/or associate them with different metadata (dominant tag, non-dominant tag, ranking, etc.). The database may also contain a link to each actual media item (e.g., media data file).

After identifying a list of images, the process 1100 initially selects (at 1115) a next image from the list. The process 1100 then determines (at 1120) whether the selected image is a dominant image. If not, the process 1100 proceeds to 1130, which is described below. If the selected image is a dominant image, the process 1100 specifies a first appearance for the dominant image. In some embodiments, the process 1100 may specify that the dominant image be sized differently than the non-dominant images. Alternatively or conjunctively with the size, the dominant image may appear with a marking (e.g., text, symbol, and/or icon) or may be highlighted to indicate the dominance of the image.

At 1130, the process 1100 specifies a different appearance for the non-dominant image. Here, the process 1100 may not perform any function and present the non-dominant image using the default presentation specification. The process 1100 then determines (at 1135) whether there are any more images in the burst mode capture. If there are, the process 1100 returns to 1115, which is described above. Otherwise, the process 1100 generates (at 1140) a concurrent presentation of the images in the burst mode sequence by presenting each image according to its specified first or second appearance. The process 1100 then ends.

Some embodiments perform variations of the process 1100. The specific operations of the process may not be performed in the exact order shown and described. The specific operations may not be performed in one continuous series of operations, and different specific operations may be performed in different embodiments. In addition, one of ordinary skill in the art would understand that the various embodiments described above are not necessarily mutually exclusive combinations of features and can be combined in different ways. For example, anyone of the animated views can be combined with an affordance (e.g., a scrubber or slider) to navigate through images in a burst mode sequence. As another example, the presentation of the burst mode sequence can vary from one type of device to another (e.g., a smart phone to a tablet) or may be the same across the different types of devices. In other words, the embodiments are not mutually exclusive combinations of features; rather, the invention may include a different combinations of individual features selected from different individual embodiments, as understood by persons of ordinary skill in the art.

In some embodiments, the application allows its user to browse through images in a burst mode. On devices with a touchscreen display, the application of some embodiments allows a person to perform a touch gesture to browse through images in a burst mode sequence. The person can also switch from browsing burst mode images to browsing a collection of other images by performing a different touch gesture. Several such examples will now be described below by reference to FIGS. 12-17.

Figure 12:
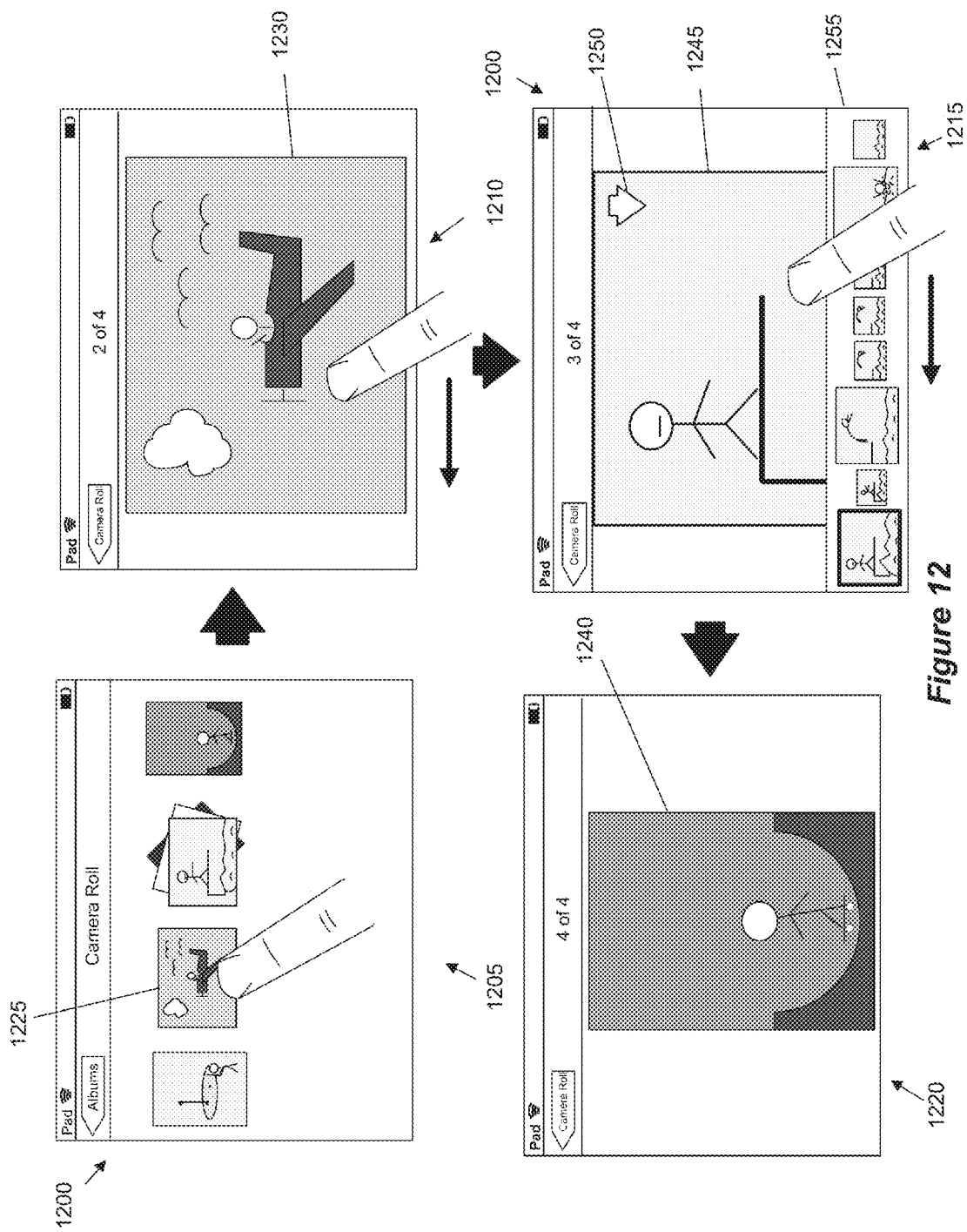
FIG. 12 illustrates browsing through images in a collection.

FIG. 12 illustrates browsing through images in a collection. Specifically, it illustrates an example touch gesture that can be performed on a mobile device's touchscreen display to browse images. In this example, the mobile device is a tablet 1200. Four operational stages 1205-1220 are shown in this figure.

The first stage 1205 shows the screen displaying several thumbnail representations of images from a collection. Here, the collection is a camera roll that includes pictures and videos captured with the tablet 1200. In the first stage, the user selects the second image by tapping the user's finger on the touchscreen display over the second thumbnail representation 1225. The selection causes the touchscreen to display a full screen representation 1230 of the second image, as illustrated in the second stage 1210.

In the second stage 1210, the user performs a touch gesture to browse to a next image in the collection. More particularly, the user performs a swipe gesture by placing the user's finger on the touchscreen and swiping towards its left-hand side, similar to flipping a page of a book. The user can swipe the finger in the opposite direction to display the previous image. When the last image is shown on the touchscreen, the user input to display the next image may result in the first image being displayed. Similarly, when the first image is displayed, the user input to display the previous image may result in the display of the last image.

The third stage 1215 illustrates the tablet 1200 after the user has performed the touch gesture to display the next image. As the next image is a group of images in a burst mode sequence, the touchscreen displays a full screen representation 1245 of the first image from the burst mode sequence. The full screen representation is shown with a marking 1250 that indicates that the first image is a representative (dominant) image. Thumbnail representations of the images in the burst mode sequence are also shown along a navigation bar 1255 in the third stage. The user can select anyone of the thumbnail representations to display its corresponding full screen representation on the touchscreen display.

As shown in the third stage 1215, the user performs the same touch gesture as mentioned above to browse to the next image. The fourth stage 1220 illustrates that touch input did not cause the application to present the second image from the burst mode sequence. Rather, the touch input caused the application to present the next image from the collection. Specifically, a full screen representation 1240 of the fourth image of the collection is now shown on the touchscreen display.

Figure 13:
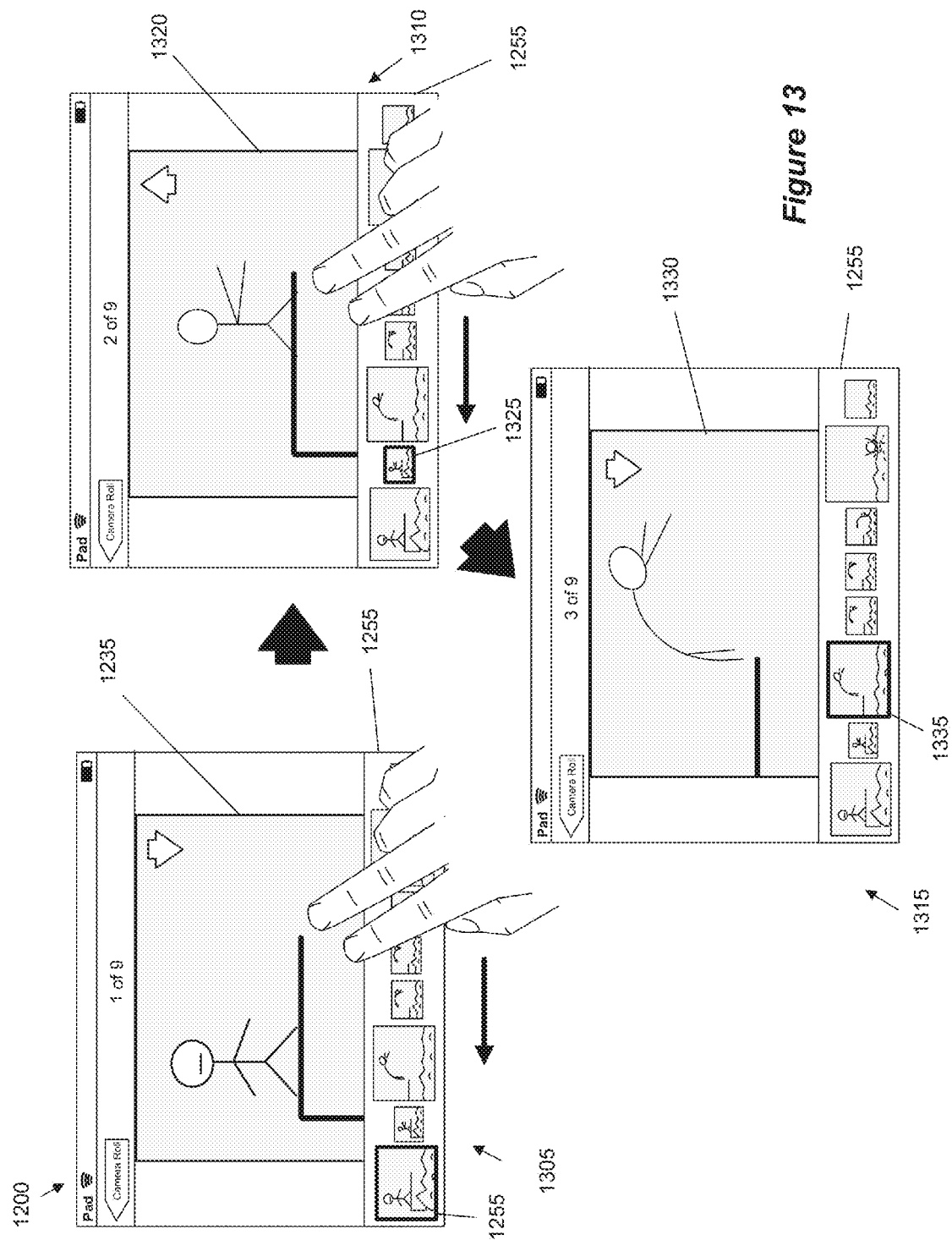
FIG. 13 provides an illustrative example of using a different touch gesture to browse through images in a burst mode sequence.

The previous example illustrated how one touch gesture can be reserved for browsing through images in a collection. This is important because people may want to use a single gesture to browse through images in a collection and not necessarily drill down to browse through images in a sub-collection (e.g., a burst mode sequence). In order to browse through the images of a burst mode sequence at the same time, the application of some embodiments allows a user to perform one touch gesture to browse through images in a collection and another different touch gesture to browse through images in a sub-collection. FIG. 13 provides an illustrative example of using a different touch gesture to browse through images in a burst mode sequence. Three operational stages 1305-1315 of a tablet are shown in this figure.

The first stage 1305 illustrates the tablet displaying the full screen representation 1235 of the first image from the burst mode sequence on its touchscreen display. Thumbnail representations of the images in the burst mode sequence are shown along the navigation bar 1255. The thumbnail representation of the first image is also highlighted on the navigation bar 1255. The highlight provides a visual feedback that the current full screen representation is that of the first image.

In the first stage 1305, the user performs a touch gesture on the tablet's touchscreen display to display the next image in the sequence. Specifically, the user performs a multi-finger swipe gesture by placing at least two fingers on the touchscreen and swiping them towards its left-hand side. The user can swipe the fingers in the opposite direction to display the previous image. When the last image in the sequence is shown, the user input to display the next image may result in the display of the first image in the sequence. Similarly, when the first image is shown, the user input to display the previous image may result in the display of the last image in the sequence.

The second stage 1310 illustrates the touch input has resulted in the display of the next image. Specifically, a full screen representation 1320 of the second image is shown on the touchscreen display. The touch input has also caused the thumbnail representation 1325 of the second image to be highlighted on the navigation bar 1255. In the third stage 1315, the user performs the same touch gesture to display the next image. As shown in the third stage 1315, the input causes the touchscreen to display a full screen representation 1330 of the third image from the sequence and causes the thumbnail representation 1335 of that same image to be highlighted on the navigation bar 1255.

Figure 14:
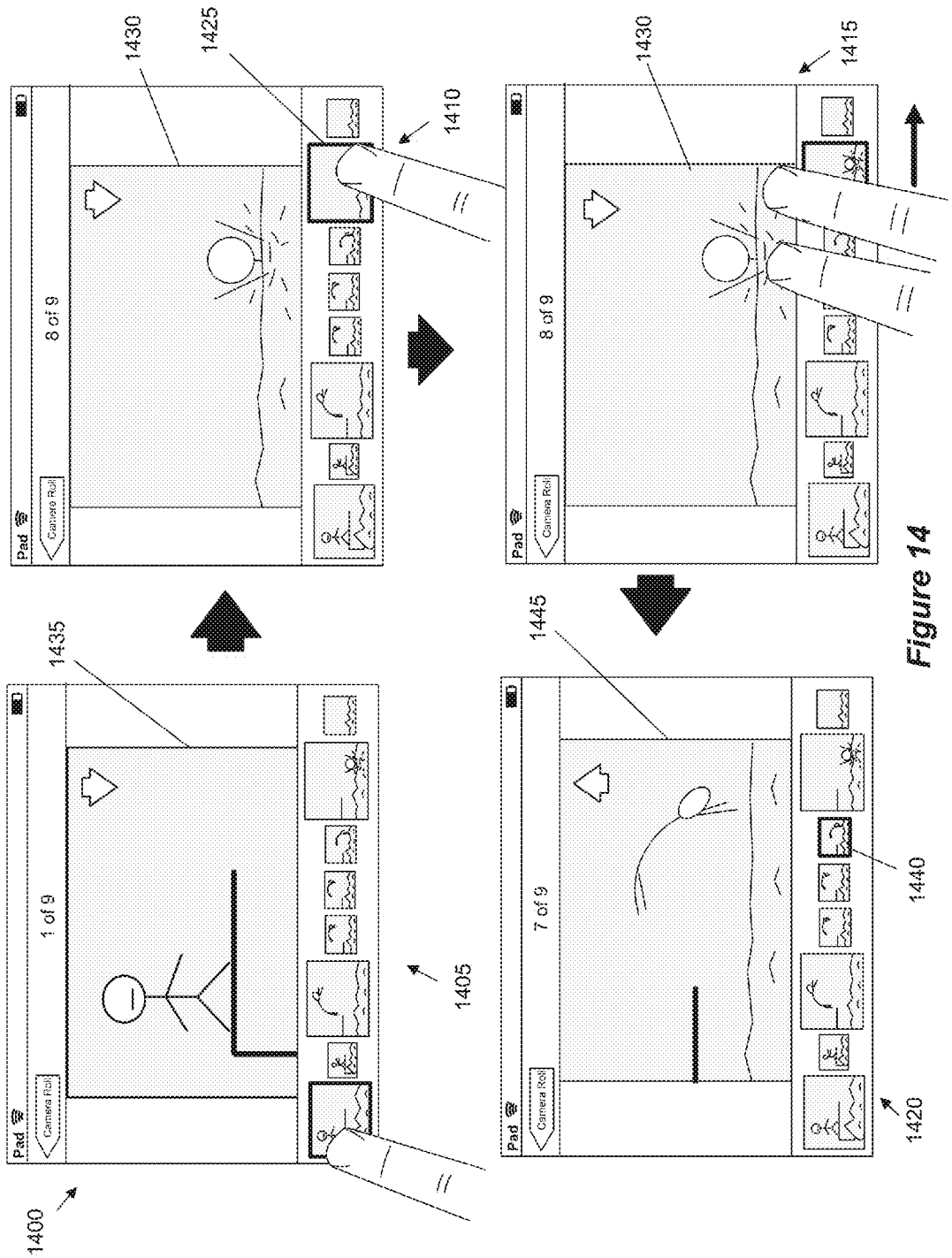
FIG. 14 illustrates an example of searching for an image in a burst mode sequence.

FIG. 14 illustrates an example of searching for an image in a burst mode sequence. This example is similar to the previous example. However, the browsing or searching is started relative to a selected image in the burst mode sequence. That is, the user first selects a thumbnail representation that corresponds to an image, and then browses through the sequence starting with that image. Four operational stages 1405-1420 of the tablet 1200 are shown in FIG. 14.

The first stage 1405 illustrates the tablet 1200 displaying the full screen representation 1235 of the first image from the burst mode sequence on its touchscreen display. The first image is the first dominant image in the sequence. In the second stage 1410, the user selects the last dominant image in the burst mode by tapping the user's finger on the thumbnail representation 1425. The selection causes the tablet's screen to display a full screen representation 1430 of the last dominant image.

The third stage 1415 illustrates browsing from the last dominant image. The user performs a touch gesture on the tablet's touchscreen display to display a previous image. Specifically, the user performs a multi-finger swipe gesture by placing at least two fingers on the touchscreen and swiping them towards the right-hand side of the touch screen. As shown in the fourth stage 1420, the input has resulted in the screen displaying a full screen representation 1445 of the previous image in the sequence.

Figure 15:
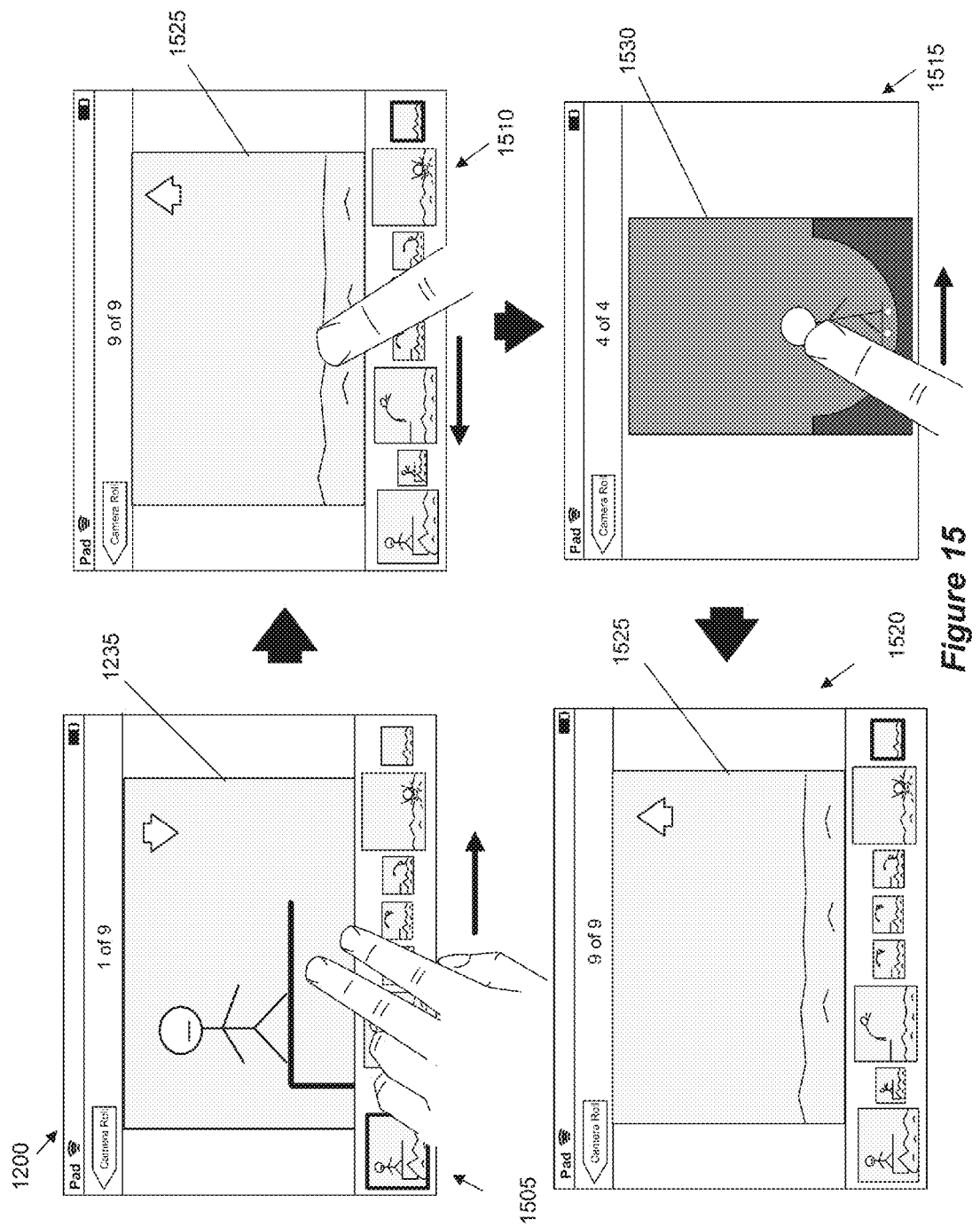
FIG. 15 provides an illustrative example of how the application of some embodiments keeps track of the browsing position in a burst mode sequence.

When browsing through a burst mode sequence, the application of some embodiments keeps track of the current position along the sequence. For instance, a user might start browsing through images in a burst mode sequence with a device and then perform some other tasks. The application maintains the position of the image that was shown last on the device before performing the other tasks. When the user returns to browsing the sequence, the application then displays the same last shown image. This is so that the user can continue the browsing session rather than restarting it from the first image. FIG. 15 provides an illustrative example of how the application of some embodiments keeps track of the browsing position for a burst mode sequence.

The first stage 1505 of the figure illustrates the tablet 1200 displaying the full screen representation 1235 of the first image in the burst mode sequence on its touchscreen display. To display the last image in the sequence, the user performs a touch gesture on the tablet's touchscreen display. Specifically, the user performs a multi-finger swipe gesture by placing at least two fingers on the touchscreen and swiping them towards the right-hand side of the screen. As shown in the second stage 1510, the user input resulted in the display of a full screen representation 1525 of the last image in the sequence.

The second stage 1510 illustrates switching from browsing the images in the sequence to browsing pictures and/or videos in the camera roll. The user performs a different touch gesture on the touchscreen display to show the next image in the collection. In particular, the user performs a single finger swipe gesture by placing the user's finger on the touchscreen and swiping it towards the left-hand side of the screen. As shown in the third stage 1515, the touch input has caused the tablet's screen to display a full screen representation 1530 of the next image in the image collection of the camera roll.

In the third stage 1515, the user performs a similar touch gesture to display a previous image. Specifically, the user performs a single finger swipe gesture by placing the user's finger on the touchscreen and swiping it in the opposite direction from one shown in the previous stage 1510. The fourth stage 1520 illustrates that the input has caused the screen to display the same full screen representation 1525 of the last image in the burst mode sequence. That is, the application has maintained the browsing history relating to the sequence so that the user does not have to restart browsing from the first image in the sequence.

Figure 16:
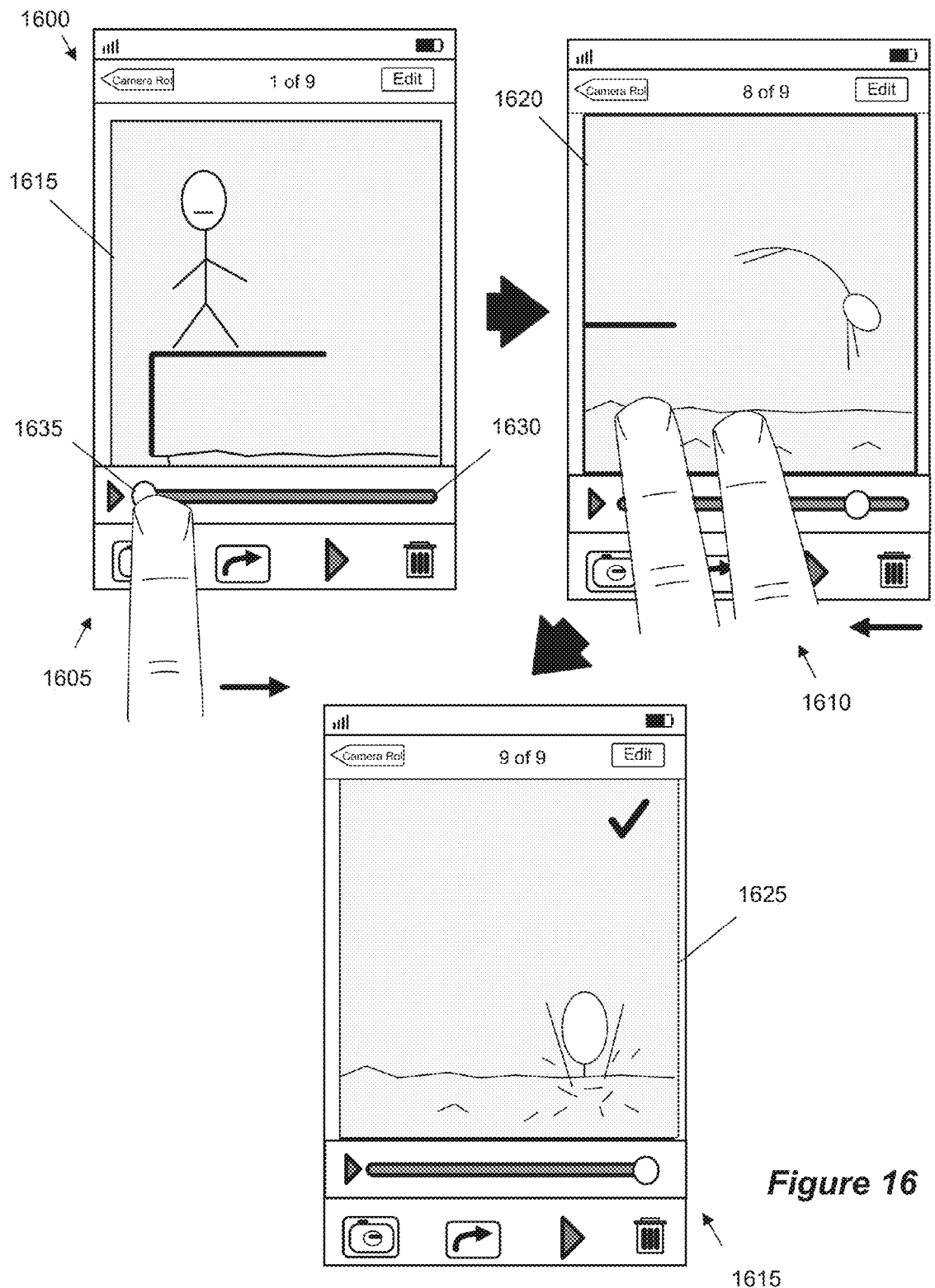
FIG. 16 illustrates another example of browsing through images in a burst mode sequence using a mobile device.

FIG. 16 illustrates another example of browsing through images in a burst mode sequence using a mobile device 1600. The mobile device of this example is a smart phone. One of ordinary skill in the art will realize that the discussion in this example as well as other examples hereinafter is equally applicable to other kinds of devices that are capable of taking pictures (e.g., a tablet, a camera, etc.) or any other electronic devices. Three operational stages 1605-1615 of the mobile device are shown in this figure.

The first stage 1605 illustrates the mobile device 1600 displaying a full screen representation 1615 of the first image in the burst mode sequence on its touchscreen display. The full screen representation is overlaid by a slider affordance, which was described above by reference to FIG. 6. The application provides a slider bar 1630 with a handle 1635 (e.g., a position indicator) that can be selected and moved to display a particular image from the sequence.

One of the benefits of such a navigation affordance is that the user can quickly browse through many images. That is the user does not have to perform multiple gestures to browse through images, namely a separate gesture for showing each next or previous image. For example, the user can select the handle 1635 by placing the user's finger over it on the touchscreen display. To quickly scrub through all the images in succession, the user then performs a touch gesture by dragging the user's finger across the touchscreen display over the slider bar 1630 from one end to the other end. The browsing speed here is relative to finger movement speed across the touchscreen display.

As shown in the first stage 1605, the user selects the handle 1635 to quickly scrub through the images in the burst mode sequence. The second stage 1610 illustrates that the navigation affordance was used to browse to the second to last image 1620. The user performs a touch gesture on the touchscreen display to display the last image in the sequence. Specifically, in the second stage, the user performs a multifinger swipe gesture by placing at least two fingers on the touchscreen and swiping them towards the left-hand side of the screen. As shown in the third stage 1615, the input has resulted in the mobile device displaying a full screen representation 1625 of the last image in the burst mode sequence.

Figure 17:
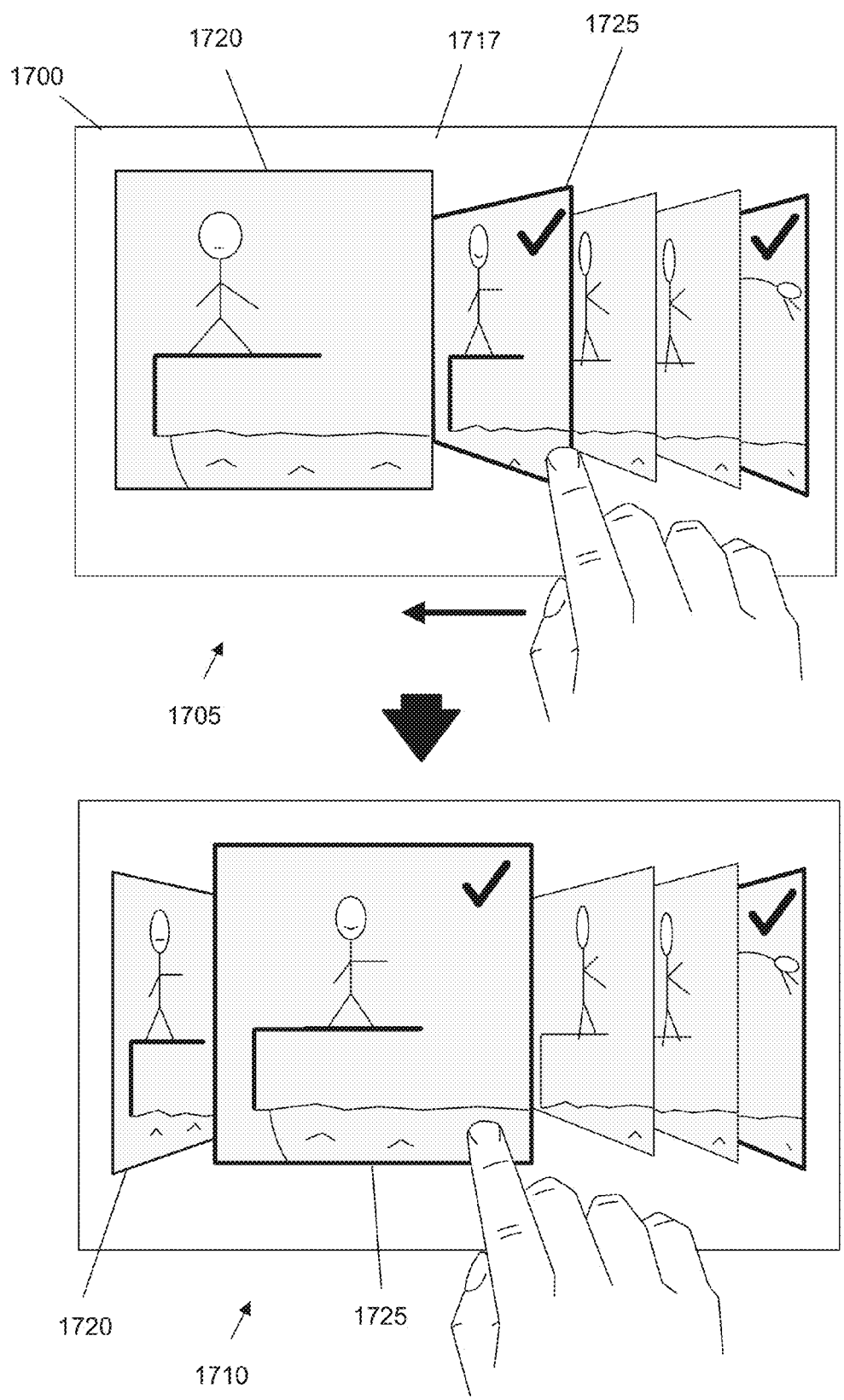
FIG. 17 illustrates an example of flipping through burst mode images in a cover flow presentation.

As mentioned above, the application of some embodiments generates an animated presentation of images in a burst mode sequence. FIG. 17 illustrates an example of flipping through burst mode images in a cover flow presentation 1715. Two stages 1705 and 1710 of a presentation display area 1700 are shown in this figure. The cover flow presentation 1715 is the same as the one described above by reference to FIG. 9.

The first stage illustrates the example cover flow presentation 1715. As shown, the presentation display area 1700 displays one center image 1720 while several of the other images are shown on its side. The side images are presented at an angle to simulate a three-dimensional view. In some embodiments, the user can interact with the presentation 1715 to change the center image. For example, the user can flick or brush the user's finger on the surface of the touchscreen over the current image 1700 to display the next image.

The first and second stages 1705 and 1710 illustrate another example of how the user can interact with the presentation 1715 to browse through the images. Instead of performing a swipe gesture on the center image 1720, in the first stage 1705, the user places the user's finger over one of the dominant images (i.e., the second image 1725). The user then moves the finger towards the center image 1720 to make the selected image the center image. As shown in the second stage 1710, the image 1720 has moved to the side as the result of the input, while the dominant image 1725 is brought to the forefront as the new center image. In some embodiments, the application allows the user to select an image to bring it to the forefront. That is, instead of the user selecting and dragging the image, the user can simply select the center image (e.g., by tapping the user's finger on the image).

For several images captured in a single burst mode operation, the application of some embodiments allows a person to designate images as either dominant or non-dominant images. For any device with a touchscreen, the application in some such embodiments allows the person to perform a touch gesture over an image shown on the touchscreen to designate that image as a dominant or non-dominant image. Several examples of classifying images will now be described below by reference to FIGS. 18-23.

Figure 18:
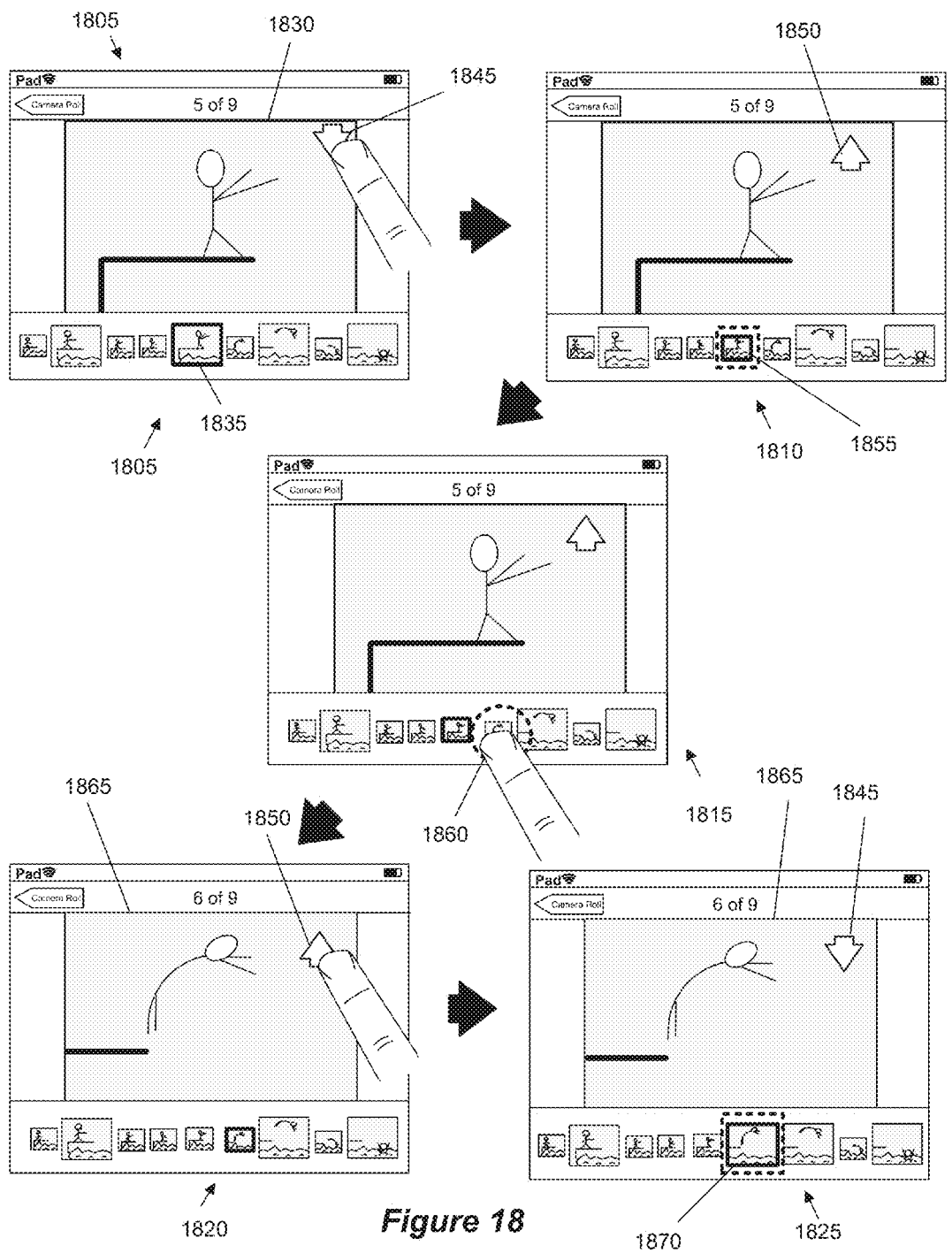
FIG. 18 illustrates examples of classifying images through an affordance.

FIG. 18 illustrates examples of classifying images through an affordance. Five stages 1805-1825 of a mobile device 1800 are shown in this figure. The first stage 1805 illustrates the device's screen displaying a full screen representation 1830 of the fifth image from the burst mode sequence. The fifth image in the sequence is a dominant image. This is indicated by (1) the thumbnail representation 1835 that is larger than the thumbnail representations of the non-dominant images. This is also indicated by a marking 1845 (e.g., a down arrow) that indicates that the image can be lowered in rank to a non-dominant image.

In some embodiments, the marking 1845 is an affordance that can be used to reclassify an image. For example, in the first stage 1805, the user selects the affordance by tapping the user's finger over it on the device's touchscreen display. The second stage 1810 illustrates the fifth image after it has been demoted to a non-dominant image. As shown, the representation is shown with a different marking 1850 (e.g., an up arrow) that indicates that the fifth image can be promoted to a dominant image again. The representation 1835 has been replaced with a lower-resolution version 1855 that is sized the same as the thumbnail representations of other non-dominant images.

In the third stage 1815, the user selects a thumbnail representation 1860 of the sixth image. The selection causes a full screen representation 1865 of the sixth image to be shown on the device's screen. The full screen representation 1865 is shown with the marking 1850 that indicates that the sixth image can be promoted to a dominant image.

In the fourth stage 1820, the user selects the marking 1850 to make the sixth image a dominant image. The fifth stage 1825 illustrates the sixth image after it has been promoted to a dominant image. As shown, the representation 1865 is now shown with the marking 1845 that indicates that the sixth image can be demoted back to a non-dominant image. The sixth image is also represented by a thumbnail 1870 that is sized the same as the thumbnails of other dominant images.

Figure 19:
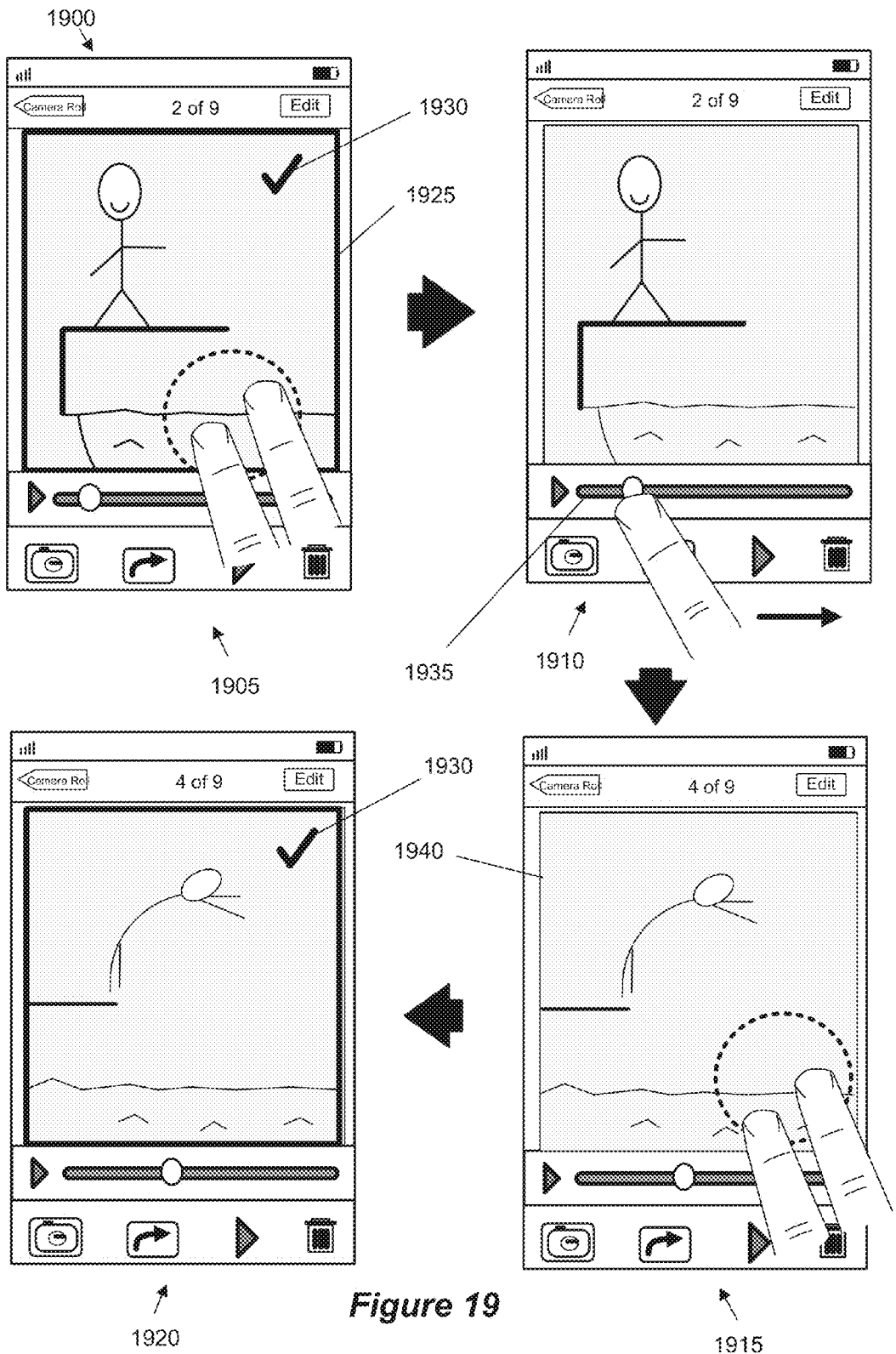
FIG. 19 illustrates another example of classifying images through a touch gesture.

FIG. 19 illustrates examples of classifying images through a touch gesture. Four operational stages 1905-1920 of a mobile device 1900 are shown in this figure. The first stage 1905 illustrates the device's screen displaying a full screen representation 1925 of an image from a burst mode sequence. The image is a dominant image. This is shown by a marking 1930 that indicates that the displayed image is a chosen image.

The first stage 1905 shows the selection of the dominant image to classify it as a non-dominant image. The user selects the full screen representation 1925 to designate the image as a non-dominant image. In particular, the user performs a touch gesture by tapping the user's fingers on the touchscreen over the full screen representation 1925. Here, the touch gesture is a multi-finger tap gesture. However, a single-finger tap gesture or some other gestures can be used, in some embodiments.

The second stage 1910 illustrates the device after designating the image as a non-dominant image. As shown, the image is no longer displayed with the marking 1930. This lack of marking provides the user with a visual indication that the displayed image is not a dominant image. In the second stage 1910, the user then uses the affordance 1935 to navigate to another image in the sequence.

The third stage 1915 illustrates the device's screen displaying a full screen representation 1940 of another image from a burst mode sequence. The image is a non-dominant image. To designate the image as a dominant image, the user performs the same touch gesture by tapping the user's fingers over the full screen representation 1940. As shown in the fourth stage 1920, the user input has resulted in the image being classified as a dominant image. This is shown with the marking 1930 that indicates that the displayed image is a dominant image.

The previous example illustrated how one touch gesture can be reserved for classifying an image in a burst mode sequence. In particular, the user performs a multi-finger tap gesture to classify the image. One reason for using such a multi-finger gesture is that the single-finger tap gesture can be used to perform a different function. FIGS. 20A and 20B illustrate an example of using a first touch gesture to display a full screen representation of an image and using a second different touch gesture to classify the image in a burst mode sequence.

FIG. 20A provides an illustrative example of using a first touch gesture to display a full screen representation of an image in a burst mode sequence. Two stages 2005 and 2010 are illustrated in this figure. This figure includes a display area 2000 that displays an animated presentation of the images in a burst mode sequence. The same animated presentation has been described above by reference to FIG. 8.

The first stage 2005 illustrates the display area 2000 displaying representations of the images from a burst mode sequence in a carousel view. The user selects the center image by tapping the user's one finger on its representation 2025. As shown in the second stage 2010, the touch input causes a full screen representation 2030 of that same image to be shown on the display area 2000.

FIG. 20B provides an illustrative example of using a second different touch gesture to classify the image as a dominant image. Two stages 2015 and 2020 are illustrated in this figure. The first stage 2015 illustrates the display area 2000 displaying representations of the images from the burst mode sequence in the carousel view. The user selects the center image to classify it as dominant image. Specifically, the user selects the image through a multi-touch gesture by tapping the user's two fingers on the representation 2025. The second stage 2020 illustrates that the touch input resulted in the image being classified as a dominant image. The classification of the image is conceptually illustrated by a text 2035 that is shown over the representation 2025.

Figure 21:
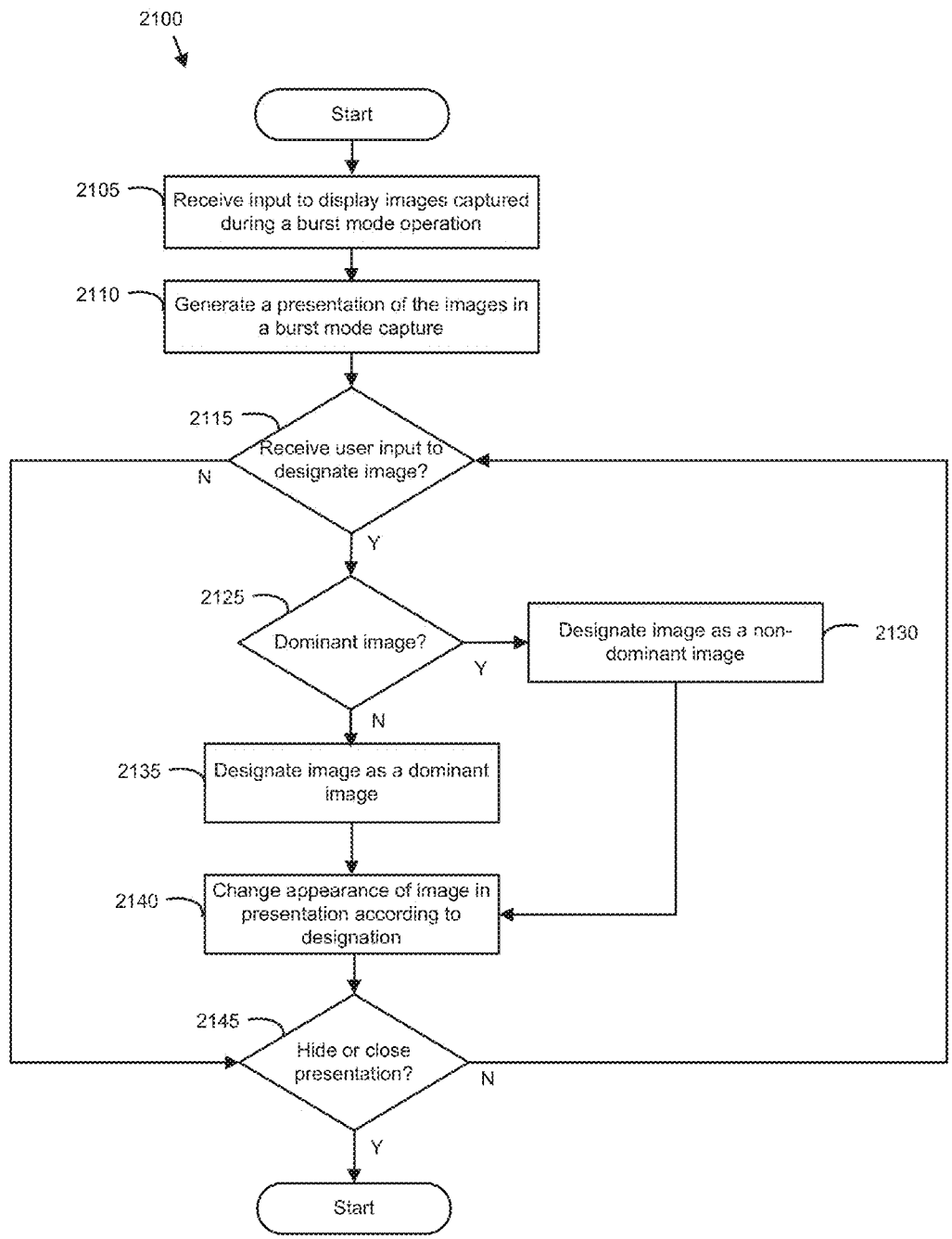
FIG. 21 conceptually illustrates a process that some embodiments use to classify images in a burst mode capture.

Having described several examples of designating images as dominant or non-dominant images, an example process will now be described. FIG. 21 conceptually illustrates a process 2100 that some embodiments use to classify images in a burst mode capture. The process 2100 in some embodiments is performed by an application (e.g., a camera application, a picture and video editing application) that executes on a computing device (e.g., a smart phone, tablet, laptop, etc.).

As shown in FIG. 21, the process 2100 begins (at 2105) when it receives input to display images captured during a burst mode operation. The process 2100 then generates (at 2110) a presentation of the images in a burst mode capture. An example of a process for generating such a presentation has been described above by reference to FIG. 9. For example, the process 2100 might generate a presentation that displays the dominant and non-dominant images differently.

At 2115, the process 2100 determines whether a user input has been received to designate an image. In some embodiments, the process 2100 might continue to monitor for such user input. The process 2100 may receive one or more other inputs than to designating an image, such as an input to display a full screen representation of the image. When the determination is made that a designating input has been received, the process 2100 determines (at 2125) whether the selected image is a dominant image. If it is not, the process 2100 proceeds to 2135, which is described below. If the selected image is a dominant image, the process 2100 designates (at 2130) the image as a non-dominant image. The process 2100 then changes (at 2140) the appearance of the image in accord with the designation.

When the determination is made that the image is a non-dominant image, the process 2100 designates (at 2135) the image as a dominant image. Similar to above, the process 2100 then changes (at 2140) the appearance of the image in accord with the designation. The process 2100 then determines (at 2145) whether to hide or close the presentation. If the process determines to hide or close the presentation, the process 2100 ends. Otherwise, the process 2100 returns to 2115, which is described above.

Some embodiments perform variations of the process 2100. The specific operations of the process may not be performed in the exact order shown and described. The specific operations may not be performed in one continuous series of operations, and different specific operations may be performed in different embodiments. In addition, one of ordinary skill in the art would understand the various embodiments described above are not necessarily mutually exclusive combinations of features and can be combined in different ways.

In many of the examples described above, the application classifies or allows a person to classify images in a burst mode sequence as either dominant or non-dominant images. In some embodiments, the application classifies images or allows a person to classify images using a different classification system. This classification system can include any number of hierarchical levels. For example, the application might allow its user to rank or grade each image following a particular scale (e.g., A-F, 1-3, 1-4, 1-10, etc.).

Figure 22:
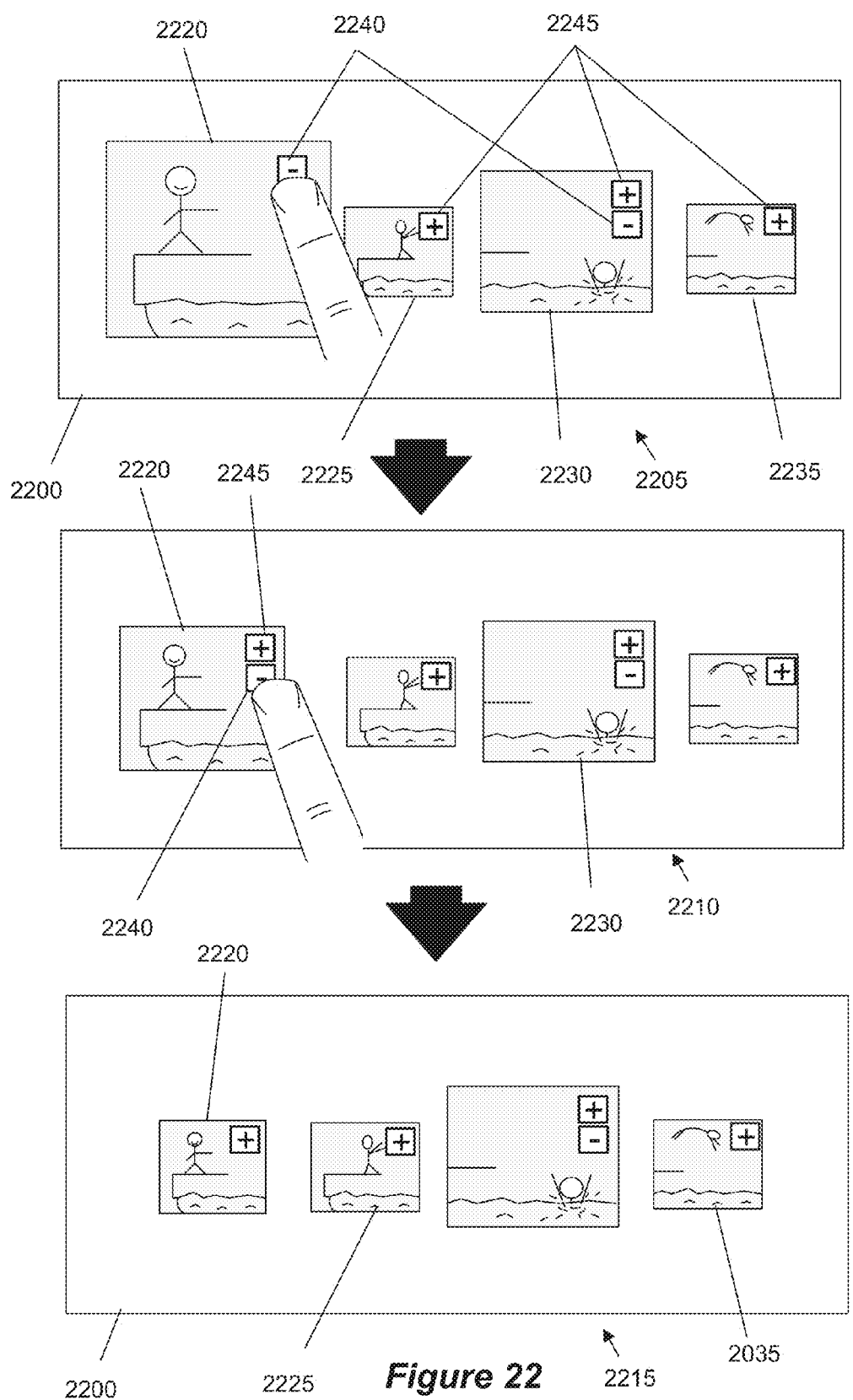
FIG. 22 illustrates an example of using a three-level classification system to classify images in a burst mode sequence.

FIG. 22 illustrates an example of using a three-level classification system to classify images in a burst mode sequence. Three stages of a presentation display area 2200 are shown in this figure. The first stage 2205 illustrates the display area 2200 displaying representations 2220-2235 of the images from a burst mode sequence. Each representation is displayed with one or more markings (2240 or 2245). In this example, each marking has plus and/or minus sign that indicate whether an image can be ranked higher or lower, respectively. The size of each representation also indicates the ranking of the corresponding image. For instance, the first image is shown with the largest representation 2220. The third image is shown with a representation 2230 that is smaller than the representations 2220 of the first image but larger than the representations 2225 and 2235 of the second and fourth images.

The first stage 2205 shows the selection of the marking 2240 with the minus sign to lower the image's ranking Specifically, the user performs a touch gesture by tapping the user's finger on the marking 2240. In the second stage 2210, the first image has been reclassified as a middle-tier image. This is shown with the representation 2020 that has been resized to the same size as the representation 2230 of the third image. As the first image can now be promoted to a higher rank, the marking 2245 appears over its representation.

The second stage 2210 shows the selection of the marking 2240 with the minus sign to lower the image's ranking even more. In the third stage 2215, the first image has been reclassified as a lower-tier image. This is shown with the representation 2220 that has been resized to the same size as the representations 2225 and 2235 of the second and fourth images. As the first image cannot be demoted to any lower rank, the representation is shown in the display area 2200 without the marking 2240.

Figure 23:
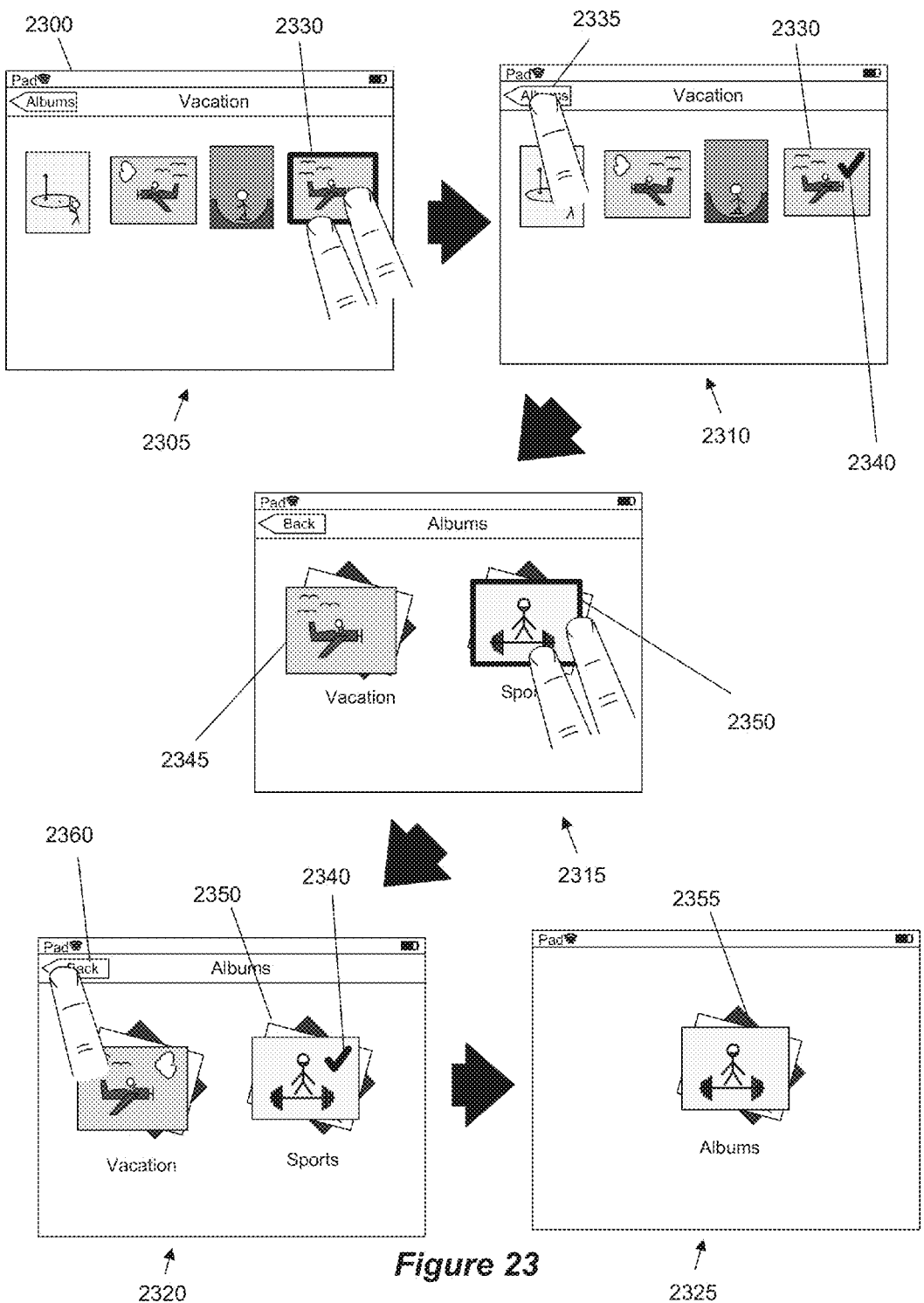
FIG. 23 illustrates an example of classifying images in a collection.

In some embodiments, the image application allows users to classify any group of images regardless of whether the group is a burst mode sequence. The application of some such embodiments allows users to classify not only images but also different groups. FIG. 23 illustrates an example of classifying images in a collection. The figure also illustrates classifying different groups to create a super group. Five operational stages 2305-2325 of a mobile device 2300 are shown in this figure.

The first stage 2305 illustrates the tablet displaying thumbnail representations of four images in a group. In this example, the group is an album entitled "Vacation". To designate the fourth image as a representative image in the album, the user selects the fourth image by tapping the user's fingers on the thumbnail representation 2330. As shown in the second stage 2310, the selection resulted in a marking 2340 being displayed over the thumbnail representation 2330. The marking 2340 provides a visual indication that the fourth image is a representative image in the album.

In the second stage 2310, the user selects an affordance 2335 (e.g., an album button) to show all lists of albums. The selection causes the tablet 2300 to display two existing albums 2345 and 2350 on its touchscreen display. Each of the two albums is shown with a cover image. Similar to a burst mode sequence representation, the application may present a representative image more prominently than a non-representative image. For example, the "Vacation" album's cover image is the same image that was designated as the representative image in the previous stage 2310.

In addition to images, the application of some embodiments allows users to classify different groups. An example of this is shown in the third stage 2315. To designate the "Sports" album as a representative album, the user selects the album by tapping the user's fingers on the album representation 2350. As shown in the fourth stage 2320, the selection resulted in the marking 2340 being displayed over the album representation 2350. The marking 2340 provides a visual indication that the corresponding album is a representative or dominant album in the group of albums. In the fourth stage 2320, the user selects an affordance 2360 (e.g., a back button) to display a main screen. The selection causes the tablet to display one representation 2355 that represents all albums. This representation is shown with a thumbnail cover image of the representative album.

The application of some embodiments presents a single composite image (thumbnail or larger sized image) to represent multiple images that are captured from an action sequence in a single burst mode operation. One example of such an action sequence is a diver diving into a pool. The action sequence might include (1) the diver standing at the podium, (2) the diver in the air, (3) the diver entering the water and (4) the diver reappearing on the surface of the water. For such a sequence, the application might generate a single composite image that is created by blending together one image of the diver in each of the four stages of the action. Several examples of generating such a composite image will now be described below by reference to FIGS. 24 and 25.

As mentioned above, the application of some embodiments displays representations of burst mode sequences different from other representations. Different from a still image, the burst mode sequence is presented as a stack of images. Specifically, thumbnails of several images in the burst sequence are stacked on top of each other. Any number of thumbnails can be stacked on top of each other. In addition, the stack may begin with the first image on top, followed by the next image, and so forth. Alternatively, the sequence may be based on location. For example, the stack may begin with the first image on top, jumping to a middle image in the sequence, and a last image, or a similar pattern depending on the number of images to show in the stack representation.

In some embodiments, the stack representation is generated by selecting dominant images from a burst mode sequence. For instance, the stack may start with the first dominant image on top, then the next dominant image, and so forth. In some embodiments, the stack representation is generated based on dominance and location. For example, the image editing application might stack images by first identifying dominant images. When there are no remaining dominant images, the application selects images based on the location. As another example, the image editing application might look for a dominant image in a section (e.g., beginning section, middle section, end section) along the sequence, and if there are no dominant images in the section, then select a particular image (e.g., the first image, the last image, etc.) in the section.

Figure 24:
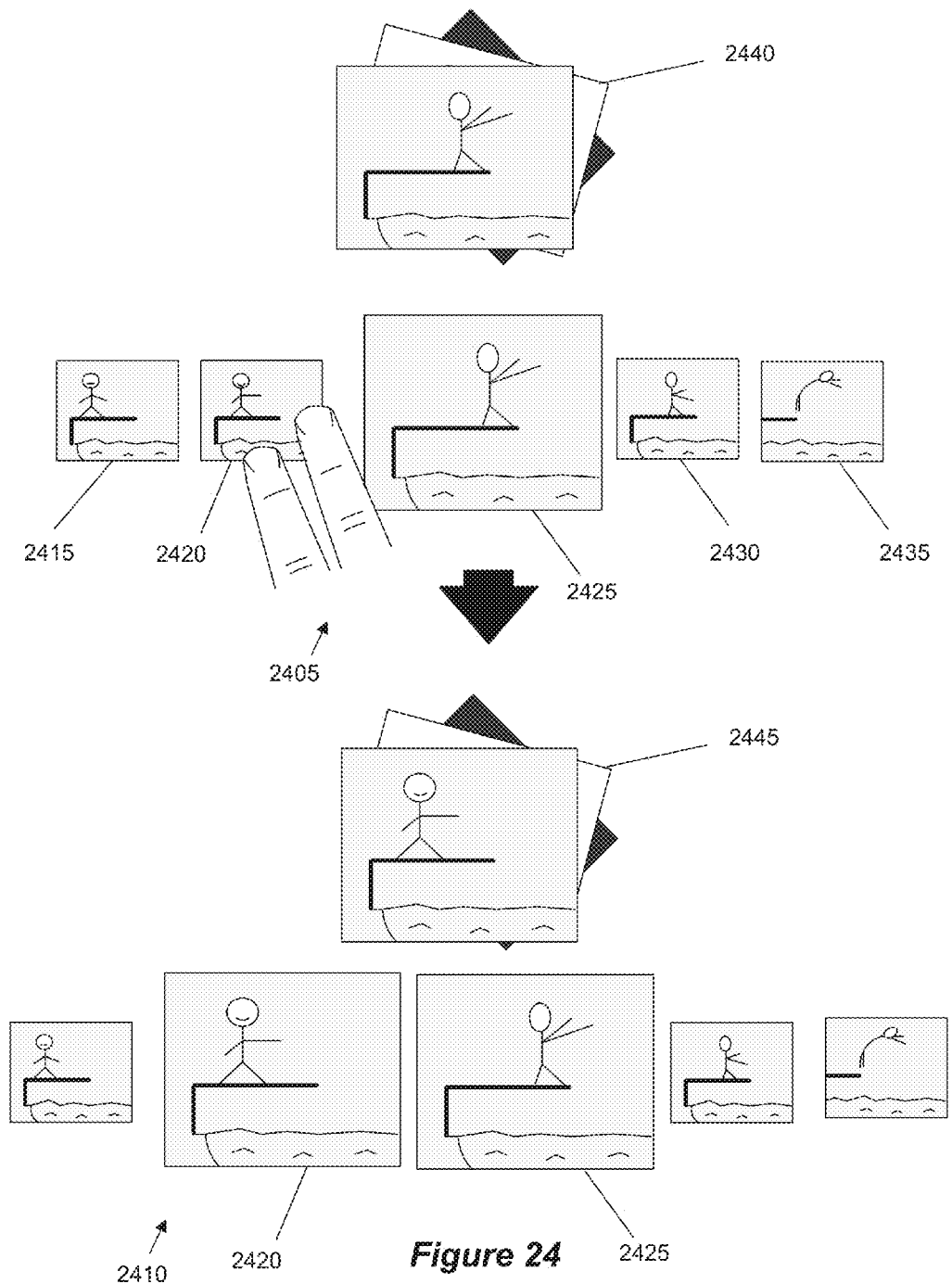
FIG. 24 conceptually illustrates how some embodiments generate a composite image that features a dominant image more prominently than other images.

FIG. 24 conceptually illustrates how some embodiments generate a composite image that features a representative image more prominently than other images. In this example, the representation is a stack representation but can be any different type of representation, such as a book or album representation with a cover image.

The first stage 2405 illustrates that the representation 2440 has been generated with the first dominant picture 2425 shown on top of the stack. Specially, this stage illustrates five pictures 2415-2435 that were captured in a single burst mode sequence. The third image 2425 has been designated as the dominant image in the burst mode sequence, while the remaining images 2415, 2420, 2430, and 2435 have been designated as non-dominant images. Accordingly, the third image 2440 is shown on top of the stack representation.

In the first stage 2405, the user specifies through a touch gesture that the second image 2420 should also be a dominant image. As shown in the second stage 2410, the user specification causes the second image to be designated as a dominant image. The designation in turn causes a new stack representation 2445 to be generated for the burst mode sequence. Since the second image 2420 is now the first dominant image in the sequence, the stack representation 2445 has the second image 2420 at the top of the stack, instead of the third image 2425.

Figure 25:
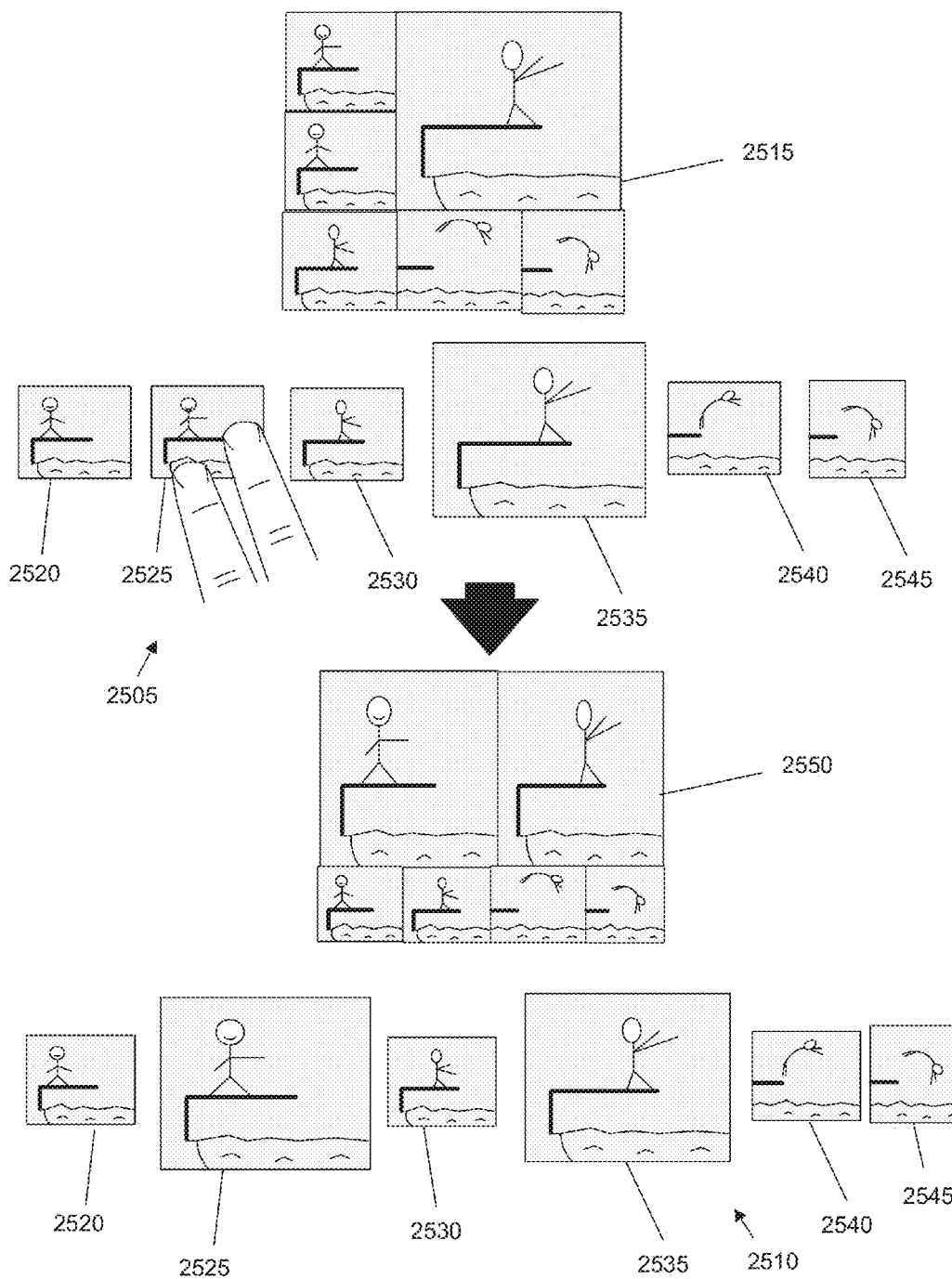
FIG. 25 conceptually illustrates another example of how some embodiments generate a composite image.

FIG. 25 conceptually illustrates another example of how some embodiments generate a composite image. Specifically, this figure illustrates an example of generating a single composite image (e.g., thumbnail or larger sized image) to represent multiple images that are captured in a single burst mode operation.

The first stage 2505 illustrates an example composite image 2515. The composite image is generated from several images 2520-2545 from the sequence. Any number of images may be used to generate the composite image. In some embodiments, the composite image shows thumbnail representations of several of the images in the sequence. For example, the thumbnail representations can be shown in sequence starting from a first position at the upper-left corner of the first row, moving across the row to the next row, etc.

In some embodiments, the composite image 2515 is generated by selecting dominant images from a burst mode sequence. For instance, the composite may start with the first dominant image, then the next dominant image, and so forth. In some embodiments, the composite representation is generated based on dominance and location. For example, the image application might stack images by first identifying dominant images and if there are no remaining dominant images, selects images based on the location. As another example, the image application might look for a dominant image in each section (e.g., beginning section, middle section, end section) along the sequence. If there are no dominant images in a section, then select one image from that section (e.g., the first photo or the first sharpest photo).

The application of some embodiments generates a composite representation that has images that are sized differently. In some embodiments, the size of each thumbnail is based on whether the corresponding image has been designated as dominant or non-dominant, in some embodiments. For example, the application might select dominant images and present them larger than other non-dominant images. This is shown in the first stage 2505, as the dominant image 2535 appears larger than the remaining images. Alternatively, the application might follow one or more preset patterns. For example, the application may make the first selected image, the second selected, or some other image make to appear larger than the remaining images. As another example, the image application might look for a dominant image in a section (e.g., beginning section, middle section, end section) along the sequence, and if there are no dominant images in the section, then select a particular image (e.g., the first image, the last image, etc.) in that section to be the larger image in the sequence.

In the first stage 2505, the user specifies though a touch gesture that the second image 2525 should also be a dominant image. As shown in the second stage 2510, the user specification causes the second image to be designated as a dominant image. The designation in turn causes a new composite image 2550 to be generated for the burst mode sequence. Since the second image 2525 is now a dominant image in the sequence, the image is featured just as prominently as the other dominant image 2535. Specially, the images 2525 and 2535 are sized the same in the representation 2550, while the remaining images appear smaller.

Figure 26:
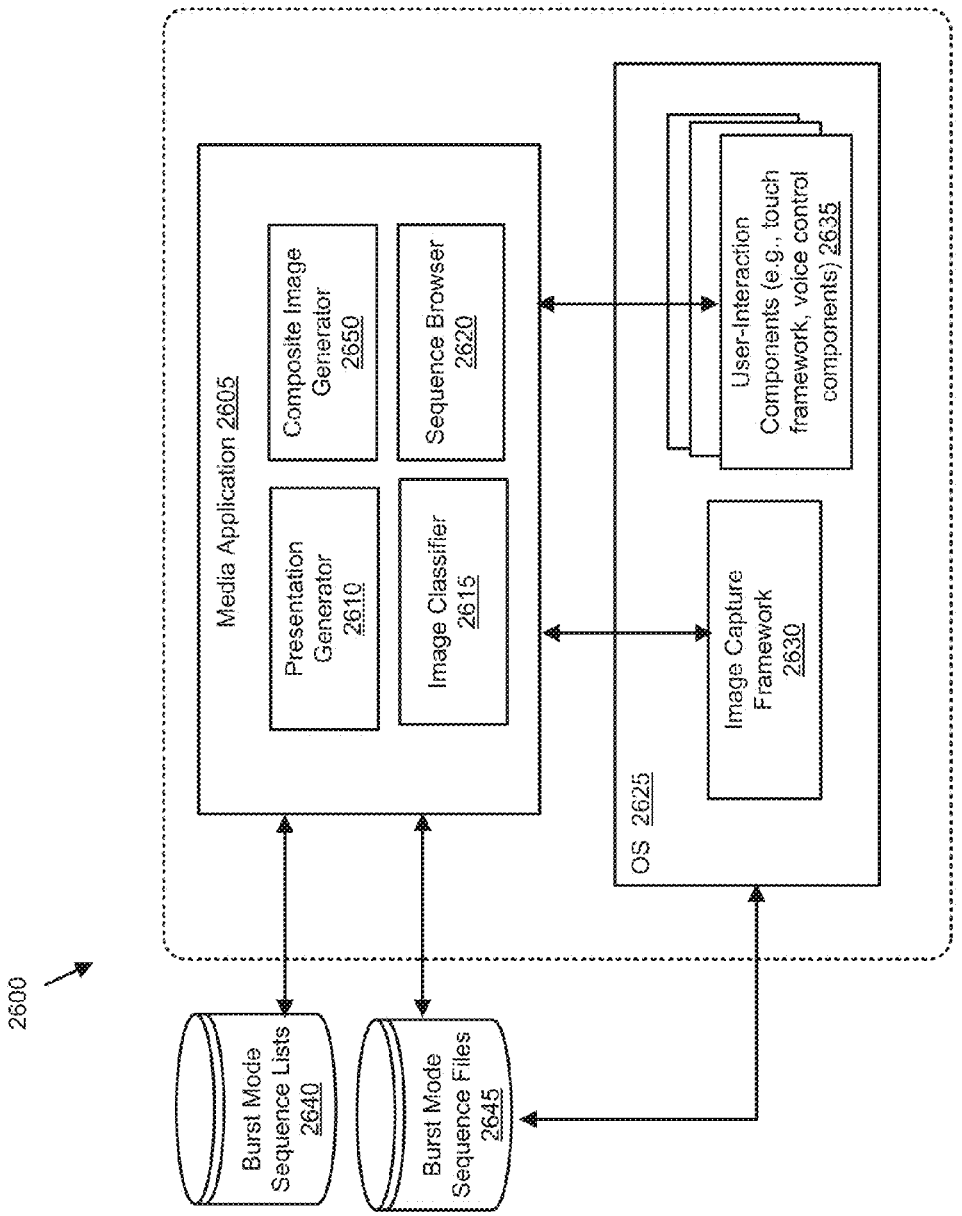
FIG. 26 conceptually illustrates the software architecture 2400 of a media application of some embodiments.

In some embodiments, the processes described above are implemented as software running on a particular machine, such as a computer or a handheld device, or stored on a machine readable medium. FIG. 26 conceptually illustrates the software architecture 2600 of a media editing application 2600 of some embodiments. In some embodiments, the application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The application 2600 includes a presentation generator 2610, an image classifier 2615, a composite image generator 2650, and a sequence browser component 2620. The figure also illustrates stored data associated with the application, including burst mode sequence lists 2640 and burst mode sequence files 2645. This figure also illustrates an operating system 2625 that includes an image capture framework 2630 for capturing and storing pictures and videos, and user-interaction components 2635 for detecting user input (e.g., touch input, voice input).

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of touch controls in the graphical user interface to control (e.g., select, move) objects in the graphical user interface. However, in some embodiments, objects in the graphical user interface can also be controlled or manipulated through other controls, such as a cursor control. In some embodiments, the touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

As shown and described above, the media application includes a number of components to present, browse, and classify burst mode sequences. In some embodiments, the presentation generator 2610 differently presents images in a burst mode sequence. For example, the presentation generator might access a sequence list from storage 2640 and determine which images in the sequence are dominant images. The presentation generator then access sequence files from the storage and presents images differently based on the determination.

The image classifier 2615 is a component of the media application 2605 that handles the classification of images. For example, the image classifier can be used to classify an image in a burst mode sequence as either a dominant or a non-dominant image. The image classifier may store the classification of each image in the sequence list, in some embodiments. Alternatively, the classification can be stored in a related data structure or some other metadata list associated with the image. The image classifier 2615 may also interact with the user-interaction components to detect different user inputs (e.g., a multi-finger touch gesture on an image, a single-finger touch gesture on an affordance or marker, etc.).

The composite image generator 2650 generates a single composite image (thumbnail or larger sized image) to represent multiple images that are captured in a single burst mode operation. In some embodiments, the composite generator generates the composite image by taking into account whether an image is classified as a dominant or non-dominant image. For example, the composite image generator may feature dominant images more prominently than non-dominant images in the composite representation.

As mentioned above, the application 2605 of some embodiments allows its user to browse through images in a burst mode. On devices with a touchscreen display, the application allows a person to perform a touch gesture to browse through images in a burst mode sequence. The person can also switch from browsing burst mode images to browsing a collection of other images by performing a different touch gesture. To facilitate such browsing feature, the application includes the sequence browser 2620. The sequence browser 2620 may communicate with the user-interaction components 2635 to detect different user inputs (e.g., touch input).

One of ordinary skilled in the art would understand that media application 2605 and the OS 2625 can include many other components, and that the architecture is a simplified one to illustrate some of the features described herein. In addition, while many of the features of the application 2600 have been described as being performed by one module, one of ordinary skill in the art will recognize that the functions described herein might be split up into multiple modules. Similarly, functions described as being performed by multiple different modules might be performed by a single module in some embodiments.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. In addition, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 27:
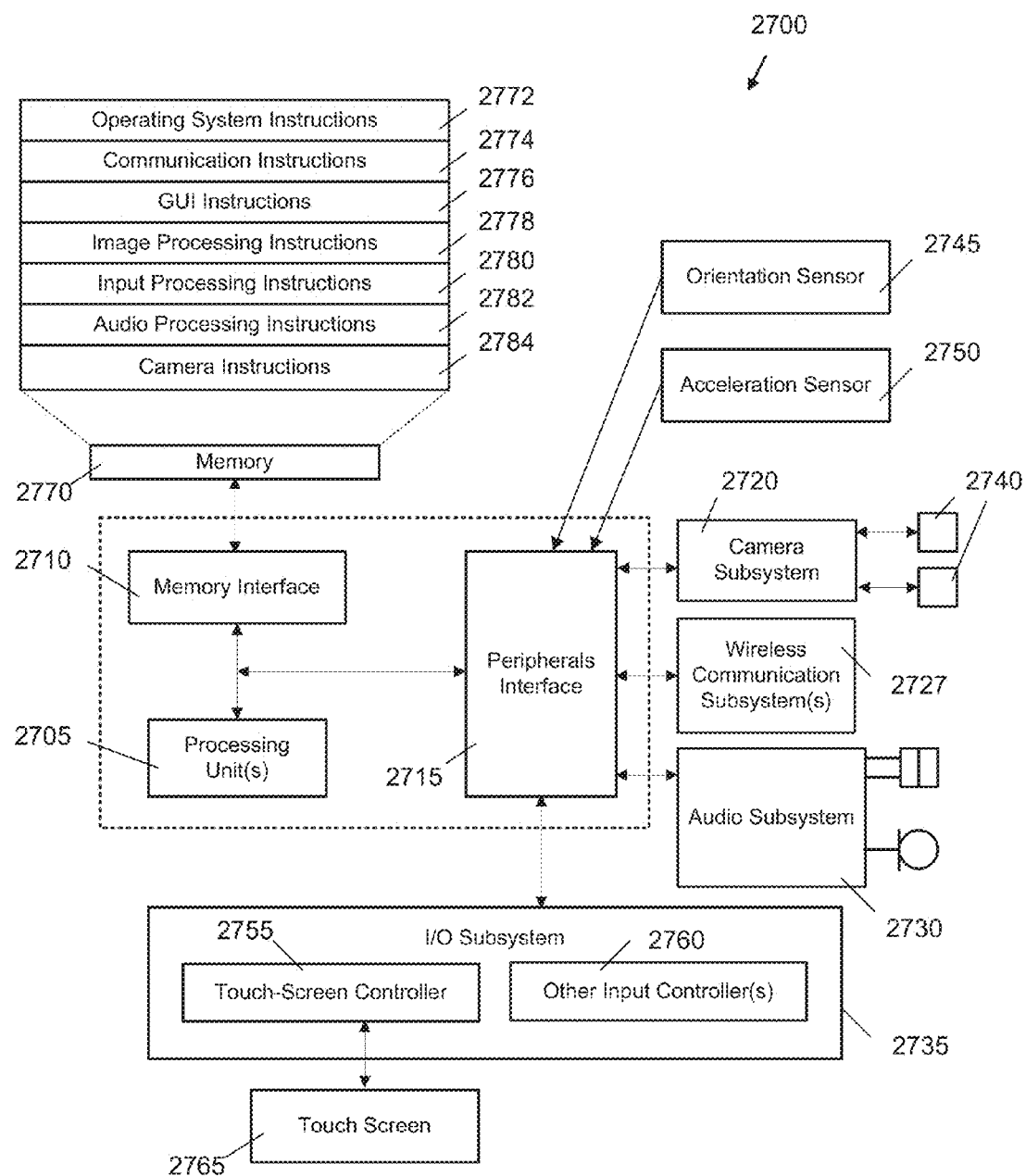
FIG. 27 is an example of an architecture of a mobile computing device.

FIG. 27 is an example of an architecture 2700 of such a mobile computing device. Examples of mobile computing devices include smartphones, tablets, laptops, etc. As shown, the mobile computing device 2700 includes one or more processing units 2705, a memory interface 2710 and a peripherals interface 2715.

The peripherals interface 2715 is coupled to various sensors and subsystems, including a camera subsystem 2720, a wireless communication subsystem(s) 2725, an audio subsystem 2730, an I/O subsystem 2735, etc. The peripherals interface 2715 enables communication between the processing units 2705 and various peripherals. For example, an orientation sensor 2745 (e.g., a gyroscope) and an acceleration sensor 2750 (e.g., an accelerometer) is coupled to the peripherals interface 2715 to facilitate orientation and acceleration functions.

The camera subsystem 2720 is coupled to one or more optical sensors 2740 (e.g., a charged coupled device (CCD) optical sensor, a complementary metal-oxide-semiconductor (CMOS) optical sensor, etc.). The camera subsystem 2720 coupled with the optical sensors 2740 facilitates camera functions, such as image and/or video data capturing. The wireless communication subsystem 2725 serves to facilitate communication functions. In some embodiments, the wireless communication subsystem 2725 includes radio frequency receivers and transmitters, and optical receivers and transmitters (not shown in FIG. 27). These receivers and transmitters of some embodiments are implemented to operate over one or more communication networks such as a GSM network, a Wi-Fi network, a Bluetooth network, etc. The audio subsystem 2730 is coupled to a speaker to output audio. Additionally, the audio subsystem 2730 is coupled to a microphone to facilitate voice-enabled functions, such as voice recognition, digital recording, etc.

The I/O subsystem 2735 involves the transfer between input/output peripheral devices, such as a display, a touchscreen, etc., and the data bus of the processing units 2705 through the peripherals interface 2715. The I/O subsystem 2735 includes a touch-screen controller 2755 and other input controllers 2760 to facilitate the transfer between input/output peripheral devices and the data bus of the processing units 2705. As shown, the touch-screen controller 2755 is coupled to a touchscreen 2765. The touch-screen controller 2755 detects contact and movement on the touchscreen 2765 using any of multiple touch sensitivity technologies. The other input controllers 2760 are coupled to other input/control devices, such as one or more buttons. Some embodiments include a near-touch sensitive screen and a corresponding controller that can detect near-touch interactions instead of or in addition to touch interactions.

The memory interface 2710 is coupled to memory 2770. In some embodiments, the memory 2770 includes volatile memory (e.g., high-speed random access memory), non-volatile memory (e.g., flash memory), a combination of volatile and non-volatile memory, and/or any other type of memory. As illustrated in FIG. 27, the memory 2770 stores an operating system (OS) 2772. The OS 2772 includes instructions for handling basic system services and for performing hardware dependent tasks.

The memory 2770 also includes communication instructions 2774 to facilitate communicating with one or more additional devices; graphical user interface instructions 2776 to facilitate graphic user interface processing; image processing instructions 2778 to facilitate image-related processing and functions; input processing instructions 2780 to facilitate input-related (e.g., touch input) processes and functions; audio processing instructions 2782 to facilitate audio-related processes and functions; and camera instructions 2784 to facilitate camera-related processes and functions. The instructions described above are merely exemplary and the memory 2770 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 27 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 27 may be split into two or more integrated circuits.

Figure 28:
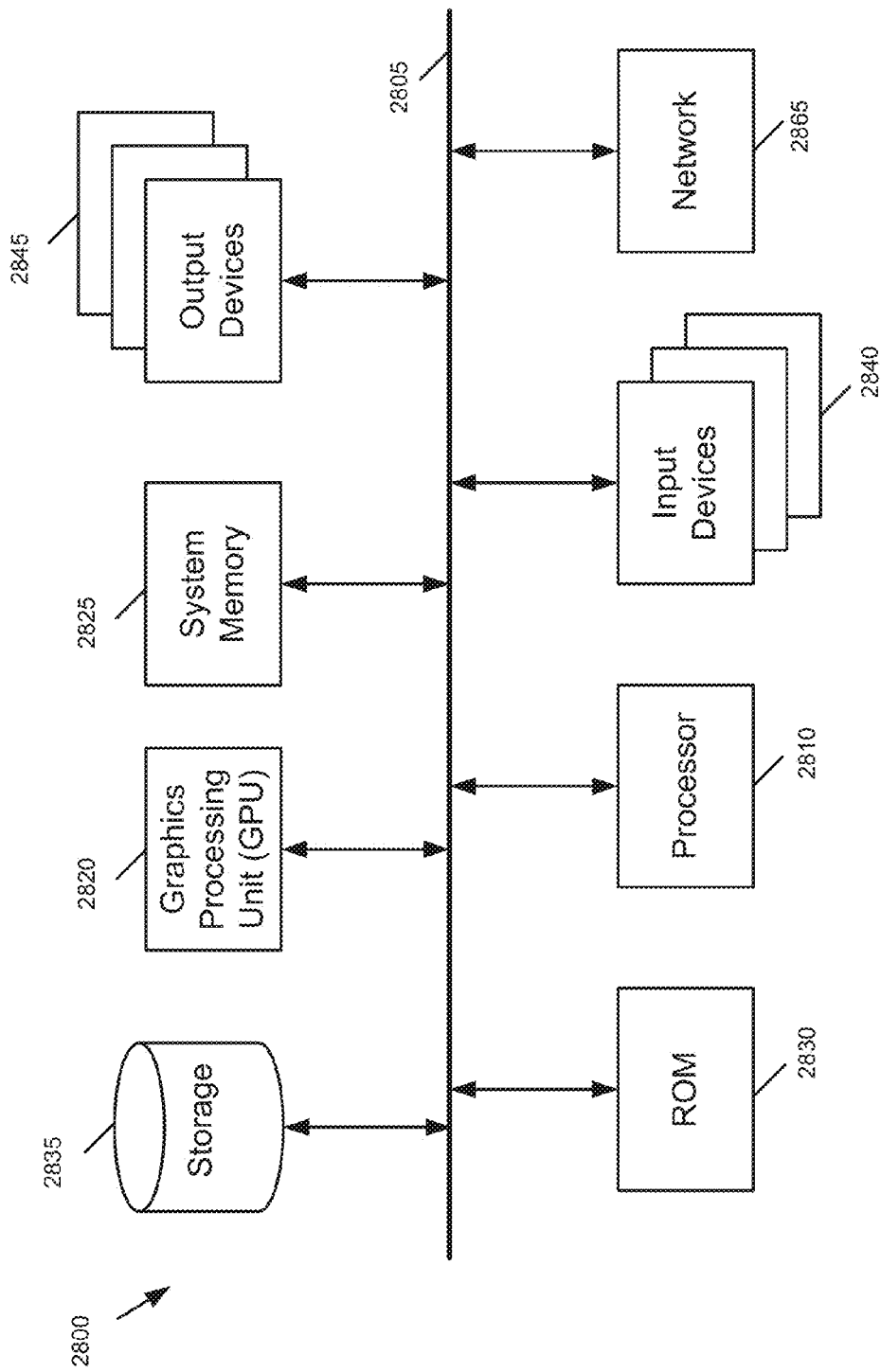
FIG. 28 conceptually illustrates another example of an electronic system with which some embodiments of the invention are implemented.

FIG. 28 conceptually illustrates another example of an electronic system 2800 with which some embodiments of the invention is implemented. The electronic system 2800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2800 includes a bus 2805, processing unit(s) 2810, a graphics processing unit (GPU) 2815, a system memory 2820, a network 2825, a read-only memory 2830, a permanent storage device 2835, input devices 2840, and output devices 2845.

The bus 2805 collectively represents all system, peripheral, and chipset buses that communicatively connect the numerous internal devices of the electronic system 2800. For instance, the bus 2805 communicatively connects the processing unit(s) 2810 with the read-only memory 2830, the GPU 2815, the system memory 2820, and the permanent storage device 2835.

From these various memory units, the processing unit(s) 2810 retrieves instructions to execute and data to process in order to execute the processes of the invention. The processing unit(s) may be a single processor or a multi-core processor in different embodiments. Some instructions are passed to and executed by the GPU 2815. The GPU 2815 can offload various computations or complement the image processing provided by the processing unit(s) 2810.

The read-only-memory (ROM) 2830 stores static data and instructions that are needed by the processing unit(s) 2810 and other modules of the electronic system. The permanent storage device 2835, on the other hand, is a read-and-write memory device. This device is a non-volatile memory unit that stores instructions and data even when the electronic system 2800 is off. Some embodiments of the invention use a mass-storage device (such as a magnetic or optical disk and its corresponding disk drive) as the permanent storage device 2835.

Other embodiments use a removable storage device (such as a floppy disk, flash memory device, etc., and its corresponding drive) as the permanent storage device. Like the permanent storage device 2835, the system memory 2820 is a read-and-write memory device. However, unlike storage device 2835, the system memory 2820 is a volatile read-and-write memory, such a random access memory. The system memory 2820 stores some of the instructions and data that the processor needs at runtime. In some embodiments, the invention's processes are stored in the system memory 2820, the permanent storage device 2835, and/or the read-only memory 2830. For example, the various memory units include instructions for processing multimedia clips in accordance with some embodiments. From these various memory units, the processing unit(s) 2810 retrieves instructions to execute and data to process in order to execute the processes of some embodiments.

The bus 2805 also connects to the input and output devices 2840 and 2845. The input devices 2840 enable the user to communicate information and select commands to the electronic system. The input devices 2840 include alphanumeric keyboards and pointing devices (also called "cursor control devices"), cameras (e.g., webcams), microphones or similar devices for receiving voice commands, etc. The output devices 2845 display images generated by the electronic system or otherwise output data. The output devices 2845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 28, bus 2805 also couples electronic system 2800 to a network 2825 through a network adapter (not shown). In this manner, the computer can be a part of a network of computers (such as a local area network ("LAN"), a wide area network ("WAN"), or an Intranet, or a network of networks, such as the Internet. Any or all components of electronic system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 11 and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, one of ordinary skill in the art will understand that many of the UI items of in FIGS. 1-10, 20-20, 22, and 23) can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A method, comprising:
   at an electronic device with a display, a camera, and one or more processors:
   capturing, with the camera, a plurality of images in a single burst mode capture;
   automatically designating a set of two or more of the captured images as dominant images;
   in a presentation of the plurality of images captured during the single burst mode capture, presenting the dominant images in a different manner from non-dominant images in the plurality of images, wherein the presenting includes, for each respective image that is a dominant image, displaying a marking with the respective image that indicates that the respective image is a dominant image; and,
   in response to a user's selection of the marking with the respective image,
   designating the respective image as a non-dominant image; and
   presenting the designated respective image without the marking that indicates that the respective image is a dominant image.

2. The method of claim 1 further comprising providing an option to retain only the set of two or more of the captured images designated as dominant images and to delete any remaining images from the plurality of images captured during the single burst mode capture.

3. The method of claim 1, wherein each respective dominant image of the dominant images appears larger than each respective non-dominant image of the non-dominant images in the presentation.

4. The method of claim 1, wherein the user's selection of the marking with the respective image includes a single finger tap gesture on the marking.

5. A method, comprising:
at an electronic device with a display, a camera, and one or more processors:
capturing, with the camera, a plurality of images in a single burst mode capture;
automatically designating a set of two or more of the captured images as dominant images; and
in a presentation of the plurality of images captured during the single burst mode capture, presenting the dominant images in a different manner from non-dominant images in the plurality of images, wherein the presenting includes, for each respective image that is a non-dominant image, displaying a marking with the respective image that indicates that the respective image is a non-dominant image.

6. The method of claim 5 further comprising:
in response to a user's selection of the marking, designating the respective image as a dominant image; and
presenting the designated respective image without the marking in the presentation.

7. An electronic device, comprising:
a display;
a camera;
memory;
one or more processors; and
memory; and
one or more programs, wherein the one or more programs are stored in the memory and configured to be executed by the one or more processors, the one or more programs including instructions for:
capturing, with the camera, a plurality of images in a single burst mode capture;
automatically designating a set of two or more of the captured images as dominant images;
in a presentation of the plurality of images captured during the single burst mode capture, presenting the dominant images in a different manner from non-dominant images in the plurality of images, wherein the presenting includes, for each respective image that is a dominant image, displaying a marking with the respective image that indicates that the respective image is a dominant image; and,
in response to a user's selection of the marking with the respective image,
designating the respective image as a non-dominant image; and
presenting the designated respective image without the marking that indicates that the respective image is a dominant image.

8. The device of claim 7, including instructions for providing an option to retain only the set of two or more of the captured images designated as dominant images and to delete any remaining images from the plurality of images captured during the single burst mode capture.

9. The device of claim 7, wherein each respective dominant image of the dominant images appears larger than each respective non-dominant image of the non-dominant images in the presentation.

10. The device of claim 7, wherein the user's selection of the marking with the respective image includes a single finger tap gesture on the marking.

11. An electronic device, comprising:
a display;
a camera;
memory;
one or more processors; and
memory; and
one or more programs, wherein the one or more programs are stored in the memory and configured to be executed by the one or more processors, the one or more programs including instructions for:
capturing, with the camera, a plurality of images in a single burst mode capture;
automatically designating a set of two or more of the captured images as dominant images; and
in a presentation of the plurality of images captured during the single burst mode capture, presenting the dominant images in a different manner from non-dominant images in the plurality of images, wherein the presenting includes, for each respective image that is a non-dominant image, displaying a marking with the respective image that indicates that the respective image is a non-dominant image.

12. The device of claim 11, including instructions for:
in response to a user's selection of the marking, designating the respective image as a dominant image; and
presenting the designated respective image without the marking in the presentation.

13. A non-transitory computer readable storage medium storing one or more programs, the one or more programs comprising instructions, which when executed by an electronic device with a display, and a camera, cause the device to:
capture, with the camera, a plurality of images in a single burst mode capture;
automatically designate a set of two or more of the captured images as dominant images;
in a presentation of the plurality of images captured during the single burst mode capture, present the dominant images in a different manner from non-dominant images in the plurality of images, wherein the presenting includes, for each respective image that is a dominant image, displaying a marking with the respective image that indicates that the respective image is a dominant image; and,
in response to a user's selection of the marking with the respective image,
designate the respective image as a non-dominant image; and
present the designated respective image without the marking that indicates that the respective image is a dominant image.

14. The computer readable storage medium of claim 13, including instructions, which when executed by the electronic device with the display, and the camera, cause the device to provide an option to retain only the set of two or more of the captured images designated as dominant images and to delete any remaining images from the plurality of images captured during the single burst mode capture.

15. The computer readable storage medium of claim 13, wherein each respective dominant image of the dominant images appears larger than each respective non-dominant image of the non-dominant images in the presentation.

16. The computer readable storage medium of claim 13, wherein the user's selection of the marking with the respective image includes a single finger tap gesture on the marking.

17. A non-transitory computer readable storage medium storing one or more programs, the one or more programs comprising instructions, which when executed by an electronic device with a display, and a camera, cause the device to:
capture, with the camera, a plurality of images in a single burst mode capture;

automatically designate a set of two or more of the captured images as dominant images; and in a presentation of the plurality of images captured during the single burst mode capture, present the dominant images in a different manner from non-dominant images in the plurality of images, wherein the presenting includes, for each respective image that is a non-dominant image, displaying a marking with the respective image that indicates that the respective image is a non-dominant image.

18. The computer readable storage medium of claim 17, including instructions, which when executed by the electronic device with the display, and the camera, cause the device to:

in response to a user's selection of the marking, designate the respective image as a dominant image; and present the designated respective image without the marking in the presentation.

* * * * *